(12) United States Patent
Kuroda et al.

(10) Patent No.: US 11,561,770 B2
(45) Date of Patent: Jan. 24, 2023

(54) SYSTEM CONFIGURATION DERIVATION DEVICE AND SYSTEM CONFIGURATION DERIVATION METHOD

(71) Applicant: NEC Corporation, Tokyo (JP)

(72) Inventors: Takayuki Kuroda, Tokyo (JP); Takuya Kuwahara, Tokyo (JP); Takashi Maruyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/053,627

(22) PCT Filed: Apr. 8, 2019

(86) PCT No.: PCT/JP2019/015311
§ 371 (c)(1),
(2) Date: Nov. 6, 2020

(87) PCT Pub. No.: WO2019/216082
PCT Pub. Date: Nov. 14, 2019

(65) Prior Publication Data
US 2021/0240448 A1 Aug. 5, 2021

(30) Foreign Application Priority Data
May 7, 2018 (JP) .............................. JP2018-089145

(51) Int. Cl.
*G06F 9/44* (2018.01)
*G06F 8/10* (2018.01)
(Continued)

(52) U.S. Cl.
CPC .................. *G06F 8/10* (2013.01); *G06F 8/35* (2013.01); *G06F 8/4436* (2013.01); *G06F 8/71* (2013.01); *G06F 9/44505* (2013.01)

(58) Field of Classification Search
None
See application file for complete search history.

(56) References Cited

U.S. PATENT DOCUMENTS 7,627,656 B1 * 12/2009 Anand .................. H04L 41/082
709/224
7,644,377 B1 * 1/2010 Saxe ........................ G06F 30/00
716/106
(Continued)

FOREIGN PATENT DOCUMENTS

JP H02-58131 A 2/1990
JP 2004-030292 A 1/2004
(Continued)

OTHER PUBLICATIONS

International Search Report for PCT Application No. PCT/JP2019/015311, dated Jul. 9, 2019.
(Continued)

*Primary Examiner* — Wei Y Zhen
*Assistant Examiner* — Lanny N Ung
(74) *Attorney, Agent, or Firm* — Sughrue Mion, PLLC

(57) ABSTRACT

A system configuration derivation device 90 includes a storage unit 91 that stores a concretization rule in which a method is specified for concretizing abstract configuration information by confirming an unconfirmed portion of the abstract configuration information, which is information indicating configuration of a system in which the unconfirmed portion is included, and a generation unit 92 that concretizes the abstract configuration information included in configuration requirements of the system using the concretization rule stored to generate system configuration information, which is information indicating the configuration of the system in which the unconfirmed portion is not included, on the basis of the configuration requirements.

18 Claims, 28 Drawing Sheets

(51) Int. Cl.
*G06F 8/35* (2018.01)
*G06F 8/41* (2018.01)
*G06F 8/71* (2018.01)
*G06F 9/445* (2018.01)

(56) References Cited

U.S. PATENT DOCUMENTS

| | | | |
|---|---|---|---|
| 8,949,770 B2* | 2/2015 | StClair | G06F 11/3684 717/101 |
| 8,949,793 B1* | 2/2015 | Basu Mallick | G06F 11/3672 717/124 |
| 2002/0062475 A1* | 5/2002 | Iborra | G06F 16/2365 717/108 |
| 2010/0332444 A1* | 12/2010 | Akatsu | G06N 5/025 706/54 |
| 2011/0092202 A1* | 4/2011 | Mattisson | H04L 1/243 455/425 |
| 2014/0007070 A1* | 1/2014 | Huang | G06F 8/65 717/170 |
| 2017/0339251 A1* | 11/2017 | Jagannath | H04L 67/10 |
| 2018/0225133 A1 | 8/2018 | Kuroda | |

FOREIGN PATENT DOCUMENTS

| | | |
|---|---|---|
| JP | 2011-013750 A | 1/2011 |
| JP | 2014-219936 A | 11/2014 |
| JP | 2016-110325 A | 6/2016 |
| JP | 2016-189045 A | 11/2016 |
| WO | 2016/111679 A1 | 7/2016 |
| WO | 2017/017937 A1 | 2/2017 |
| WO | 2017/033441 A1 | 3/2017 |

OTHER PUBLICATIONS

T. Binz, G. Breiter, F. Leymann, and T. Spatzier, "Portable cloud services using tosca", Internet Computing, IEEE, vol. 16, No. 3, pp. 80-85, 2012.

R. Beckett, R. Mahajan, T. Millstein, J. Padhye, and D. Walker, "Don't Mind the Gap: Bridging Network-wide Objectives and Device-level Configurations", Proceedings of the 2016 ACM SIGCOMM Conference, pp. 328-341, 2016, Brazil.

P. Jayaraman, J. Whittle, A. Elkhodary, and H. Gomaa, "Model Composition in Product Lines and Feature Interaction Detection Using Critical Pair Analysis", Model Driven Engineering Languages and Systems, pp. 151-165, 2007.

Japanese Office Action for JP Application No. 2020-518197 dated Nov. 2, 2021 with English Translation.

* cited by examiner

SYSTEM CONFIGURATION DERIVATION DEVICE AND SYSTEM CONFIGURATION DERIVATION METHOD

This application is a National Stage Entry of PCT/JP2019/015311 filed on Apr. 8, 2019, which claims priority from Japanese Patent Application 2018-089145 filed on May 7, 2018, the contents of all of which are incorporated herein by reference, in their entirety.

TECHNICAL FIELD

The present invention relates to a system configuration derivation device and a system configuration derivation method.

BACKGROUND ART

Preparatory work, that is required to be performed in advance in order to construct or update an Information and Communication Technology (ICT), includes configuration design work and procedure planning work.

The configuration design work is for designing the configuration of a system to be constructed and the configuration of a system after update. The procedure planning work is for planning the contents of the construction work for implementing the designed target configuration of the system and the contents of the update work.

When the configuration of an ICT system is designed, reusing existing development assets improves the efficiency of the design work. Non Patent Literature (NPL) 1 to NPL 3, Patent Literature (PTL) 1, and PTL 2 each disclose a technique for reusing existing development assets to design the configuration of an ICT system.

NPL 1 discloses a technique for designing according to a system to be constructed, by changing combinations of components or a value of the parameter defined for each component using the templates of the components as development assets.

NPL 2 discloses a technique for automatically designing, on the basis of the topology information about a communication network and the information regarding communication requirements, the route information setting and the like of each network device required to satisfy the communication requirements in the topology.

NPL 3 discloses a technique for designing according to a system to be constructed, by defining a change that can be executed to a base configuration represented in a graph as a graph rewriting rule and rewriting the base configuration in accordance with a selected rule.

PTL 1 discloses a design expert system construction method for automatically designing by mechanically repeating rewriting in accordance with an application procedure indicated by a rule in which an operation that applies an applicable rule among rules for rewriting a base configuration is determined in advance. The design expert system construction method disclosed in PTL 1 is a method for performing a search within a concrete area range, that is, a flat search.

PTL 2 discloses a design data automatic generation device that repeats the trial of selecting and applying an applicable rewriting rule to a base configuration including unconfirmed portions.

The design data automatic generation device disclosed in PTL 2 cancels the applied rewriting rule and tries to apply another rewriting rule when there is no applicable rewriting rule. The design data automatic generation device disclosed in PTL 2 outputs, as a design result, a configuration in which all the unconfirmed portions are determined.

PTL 3 discloses a system construction assist system intended to improve the easiness of system definition, for example, by eliminating the need to add settings according to the combination of components.

CITATION LIST

Patent Literature

PTL 1: Japanese Patent Application Laid-Open No. 1990 (H2)-58131
PTL 2: Japanese Patent Application Laid-Open No. 2011-13750
PTL 3: International Publication No. 2017/033441

Non Patent Literature

NPL 1: T. Binz, G. Breiter, F. Leymann, and T. Spatzier, "Portable cloud services using tosca", Internet Computing, IEEE, vol. 16, no. 3, pp. 80-85, 2012.
NPL 2: R. Beckett, R. Mahajan, T. Millstein, J. Padhye, and D. Walker, "Don't Mind the Gap: Bridging Network-wide Objectives and Device-level Configurations", Proceedings of the 2016 ACM SIGCOMM Conference, pp. 328-341, 2016.
NPL 3: P. Jayaraman, J. Whittle, A. Elkhodary, and H. Gomaa, "Model Composition in Product Lines and Feature Interaction Detection Using Critical Pair Analysis", Model Driven Engineering Languages and Systems, pp. 151-165, 2007.

SUMMARY OF INVENTION

Technical Problem

In an ICT system, a part of a configuration and requirements can be involved in many parts and operations. For example, the management network and a log collection function operate in conjunction with numerous other subsystems and functions. In addition, for example, resource saving constraints and addition or change of redundancy requirements can affect the entire system configuration.

As described above, in the construction and change of an ICT system, new requirements that are not specified in existing work are additionally specified in many cases. There is a demand for a technology capable of executing configuration design work and procedure planning work although new requirements are additionally specified.

In the design technique disclosed in NPL 1 that uses the templates, the operator is required to determine components that are development assets, the combination of components, and the values of adjustable parameters. That is, when the scale of the system to be designed is expanded or the requirements that need to be considered are increased, it is difficult for the operator to efficiently design the system configuration with the technique disclosed in NPL 1.

The automatic design technique disclosed in NPL 2 with a limited usage designs only the communication path settings that satisfies the communication requirements in a communication network that can be implemented with the input topology without considering the possibility that the input topology is redesigned.

That is, the usage of the automatic design technique disclosed in NPL 2 is limited to the specific requirement of route design. Since the usage is limited, it is difficult for the automatic design technique disclosed in NPL 2 to meet design requirements, when, for example, a new requirement, such as comprehensively designing topology and route setting in consideration of redundancy, is specified.

In the automatic design technique disclosed in NPL 3 that expands only fixed elements, the application target of the rewriting rule is limited to a subgraph representing a concrete configuration that has been determined. That is, the automatic design technique disclosed in NPL 3 can only meet a design request that expands a part of the existing concrete configuration.

The design expert system construction method disclosed in PTL 1 can mechanically rewrite the configuration by applying an arbitrary rewriting rule. However, when rewriting, the operator is required to specify the rewriting rule to be applied in advance.

The design expert system construction method disclosed in PTL 1 can be configured such a manner as to generate various design patterns by the operator easing the limitation of the rewriting rule to be applied to mechanically select the rewriting rule and repeat the trial. The design expert system construction method disclosed in PTL 1 whose configuration has been changed extracts an appropriate design result from the generated design patterns.

However, when the configuration is changed as described above, a large number of design patterns are generated. Thus, problems that an excessive amount of computation can be required, that the number of rewriting rules for dealing with a plurality of requirements can be too large to perform description, and the like can occur.

The design data automatic generation device disclosed in PTL 2 designs by limiting the configuration to be designed to a configuration that can be gradually refined, such as a tree structure graph or the like, in order to limit the search space and simplify the description of the rewriting rule.

That is, in the design data automatic generation device disclosed in PTL 2, problems of requiring an excessive amount of computation or of a large number of rewriting rules do not occur. However, since the configuration that can be designed is limited to a configuration that can be gradually refined, such as a tree structure or the like, it is difficult for the design data automatic generation device disclosed in PTL 2 to design a general ICT system.

The system construction assist system disclosed in PTL 3 receives, as an input, the configuration information including all the information required for concretization. However, the system construction assist system disclosed in PTL 3 cannot process the configuration information that does not include some information required for concretization.

[Purpose of Invention]

In view of the above, an object of the present invention is to provide a system configuration derivation device and a system configuration derivation method that solve the above problems and are capable of designing the configuration of an ICT system on the basis of an abstract configuration requirement.

Solution to Problem

In an exemplary embodiment of the present invention, a system configuration derivation device includes a storage unit that stores a concretization rule in which a method is specified for concretizing abstract configuration information by confirming an unconfirmed portion of the abstract configuration information, which is information indicating configuration of a system in which the unconfirmed portion is included, and a generation unit that concretizes the abstract configuration information included in configuration requirements of the system using the concretization rule stored to generate system configuration information, which is information indicating the configuration of the system in which the unconfirmed portion is not included, on the basis of the configuration requirements.

In an exemplary embodiment of the present invention, a system configuration derivation method includes storing, in a storage unit, a concretization rule in which a method is specified for concretizing abstract configuration information by confirming an unconfirmed portion of the abstract configuration information, which is information indicating configuration of a system in which the unconfirmed portion is included, and concretizing the abstract configuration information included in configuration requirements of the system using the concretization rule stored to generate system configuration information, which is information indicating the configuration of the system in which the unconfirmed portion is not included, on the basis of the configuration requirements.

In an exemplary embodiment of the present invention, a computer-readable recording medium recording a system configuration derivation program causing, when executed by a computer, the computer to execute storing, in a storage unit, a concretization rule in which a method is specified for concretizing abstract configuration information by confirming an unconfirmed portion of the abstract configuration information, which is information indicating configuration of a system in which the unconfirmed portion is included, and concretizing the abstract configuration information included in configuration requirements of the system using the concretization rule stored to generate system configuration information, which is information indicating the configuration of the system in which the unconfirmed portion is not included, on the basis of the configuration requirements.

Advantageous Effects of Invention

According to the present invention, it is possible to design a configuration of an ICT system on the basis of an abstract configuration requirement.

requirement directed from a subject requesting a communicable domain to the communicable domain.

Figure 10:
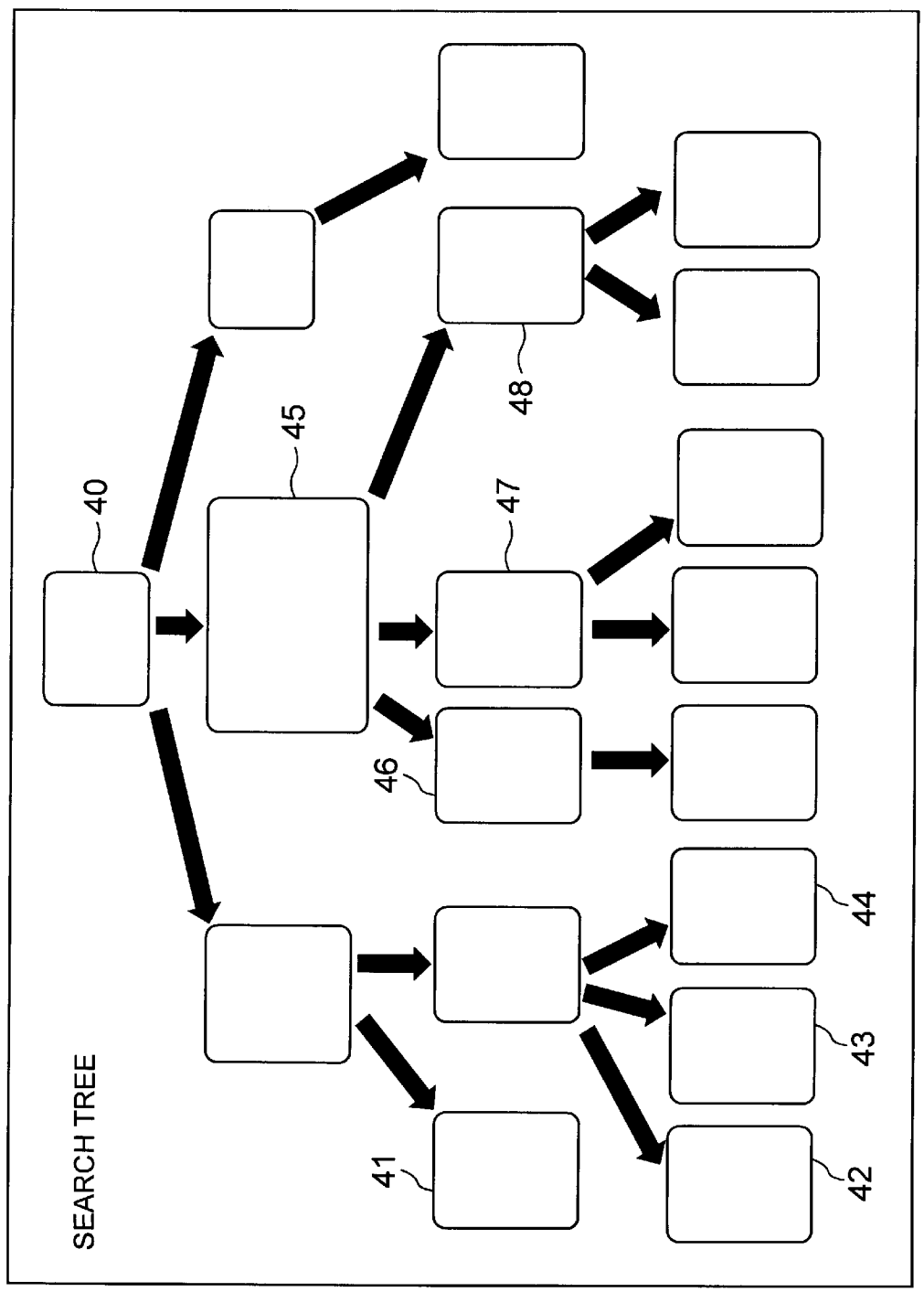

FIG. 10 is an explanatory diagram showing an example of a search tree representing a process for concretizing an abstract configuration by a configuration information concretization unit 110.

Figure 11:
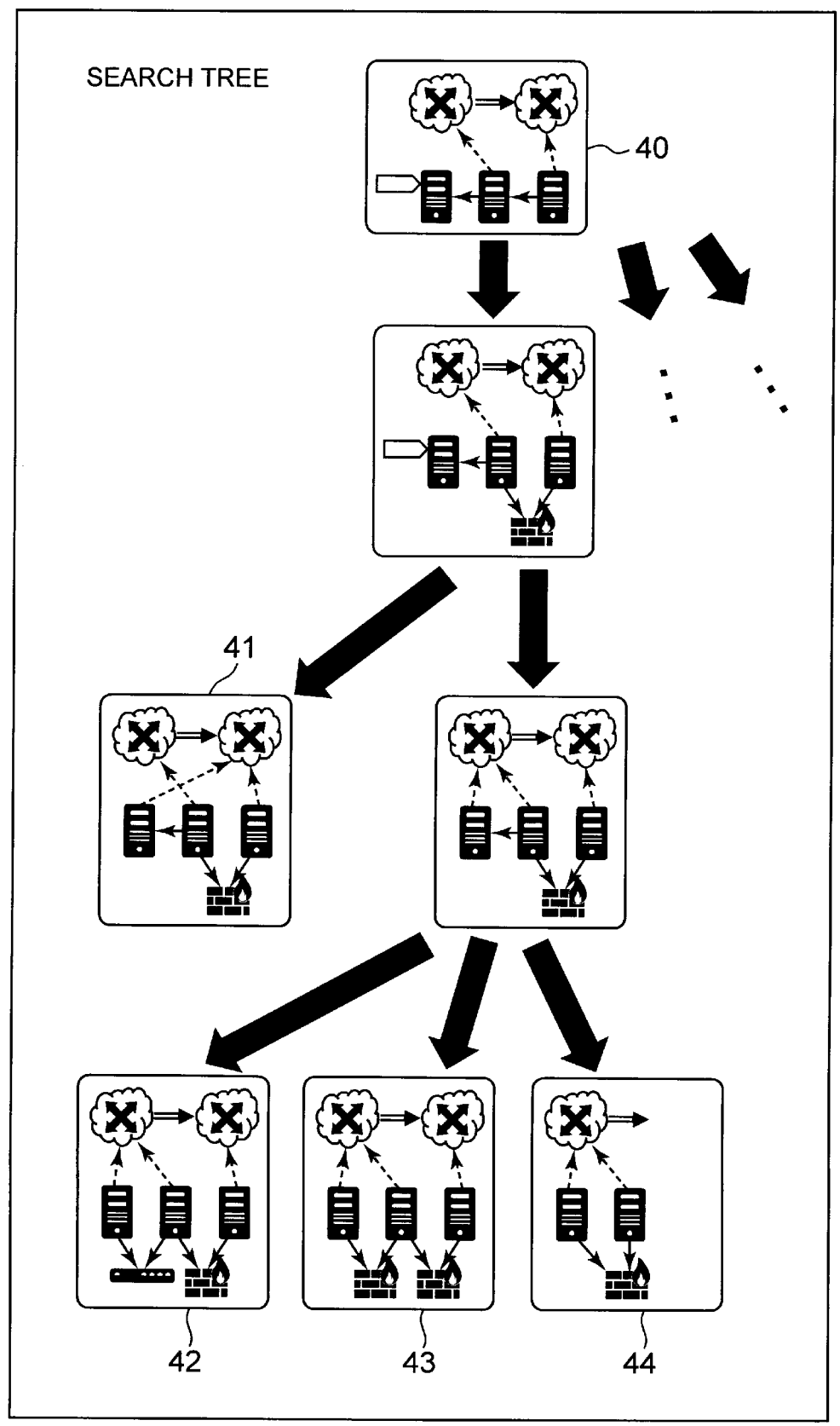

FIG. 11 is an explanatory diagram showing a part of the search tree shown in FIG. 10.

Figure 12:
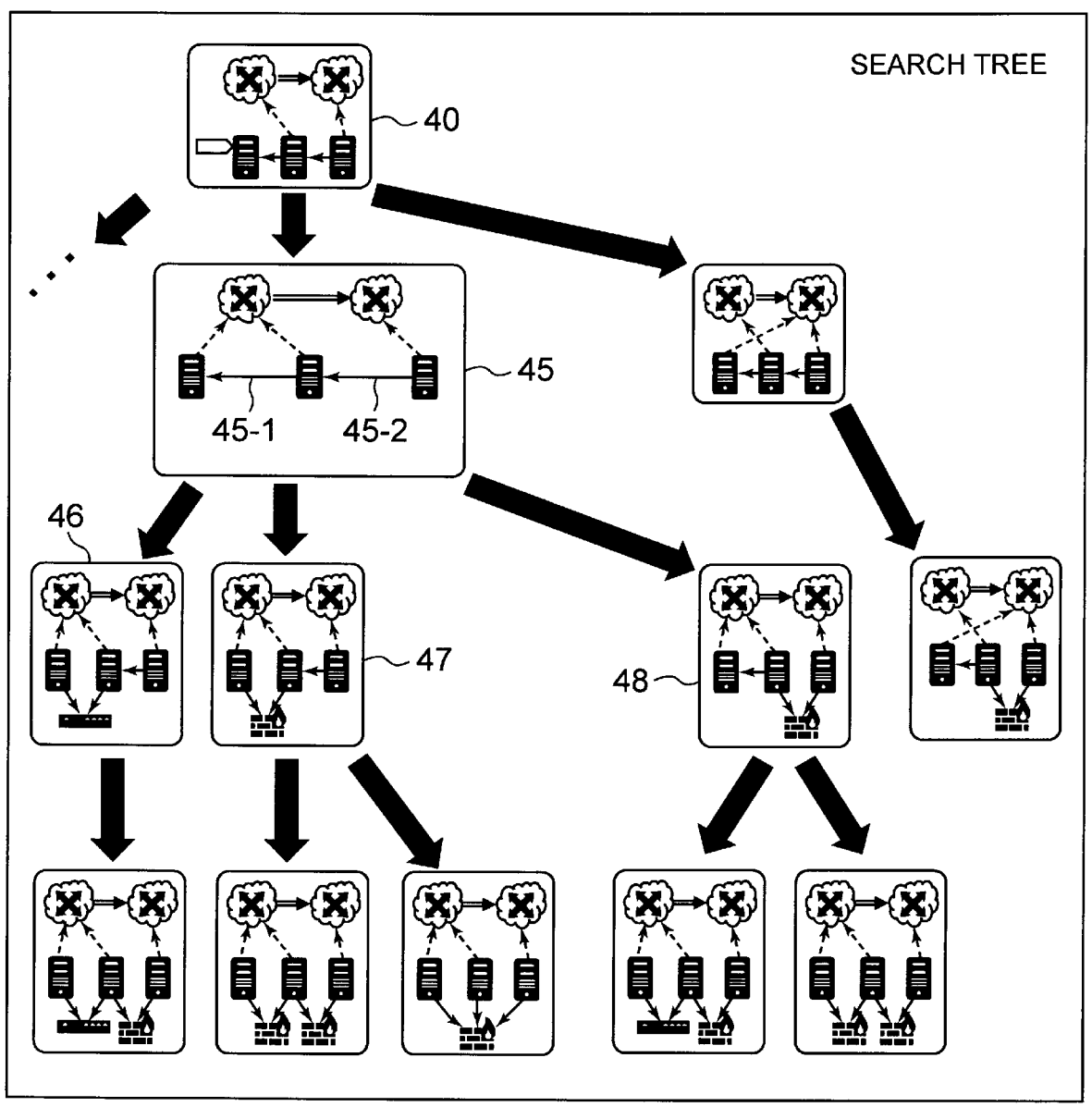

FIG. 12 is an explanatory diagram showing another part of the search tree shown in FIG. 10.

Figure 13:
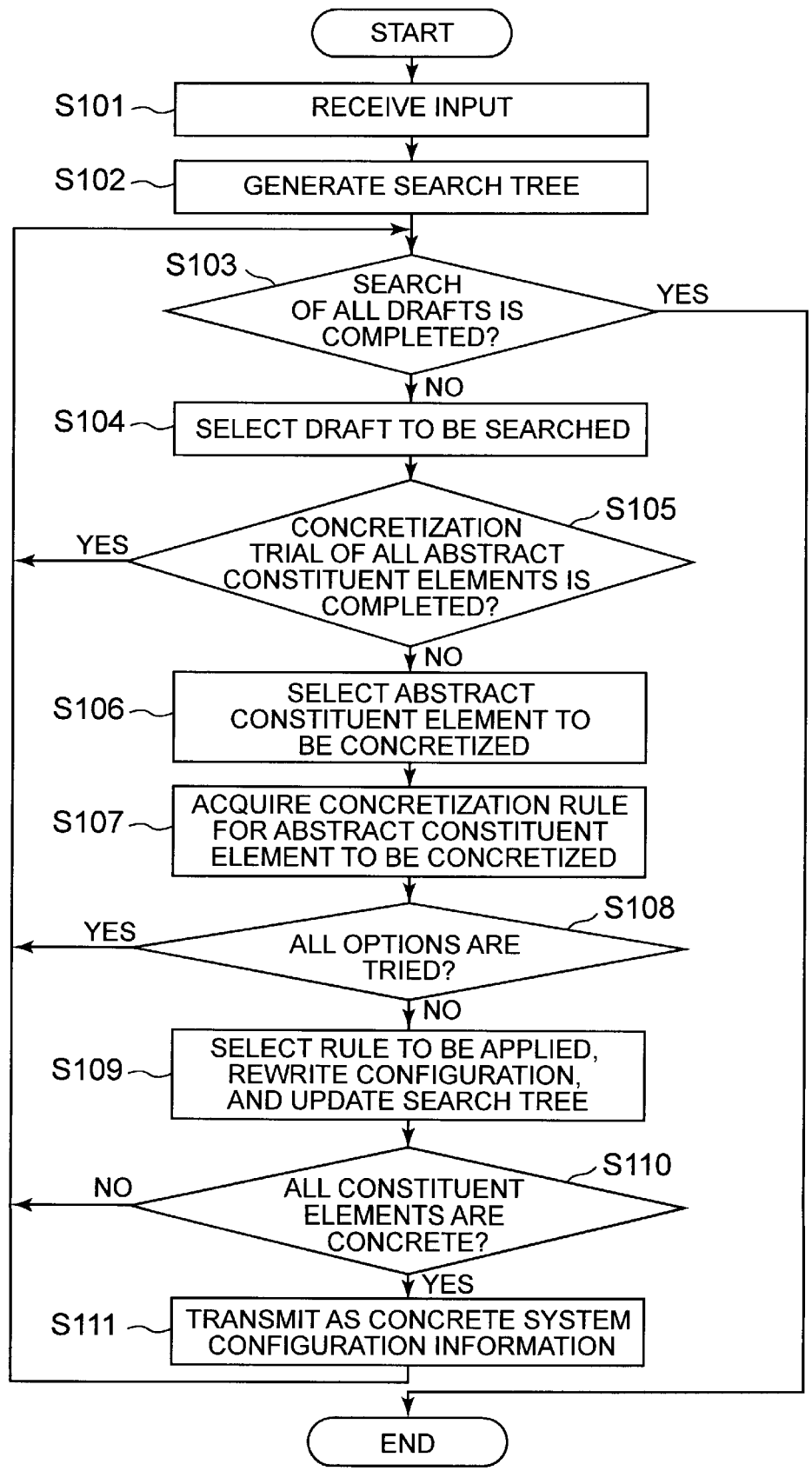

FIG. 13 is a flowchart showing an operation in a system configuration derivation process of a system configuration derivation device 100 in the first exemplary embodiment.

Figure 14:
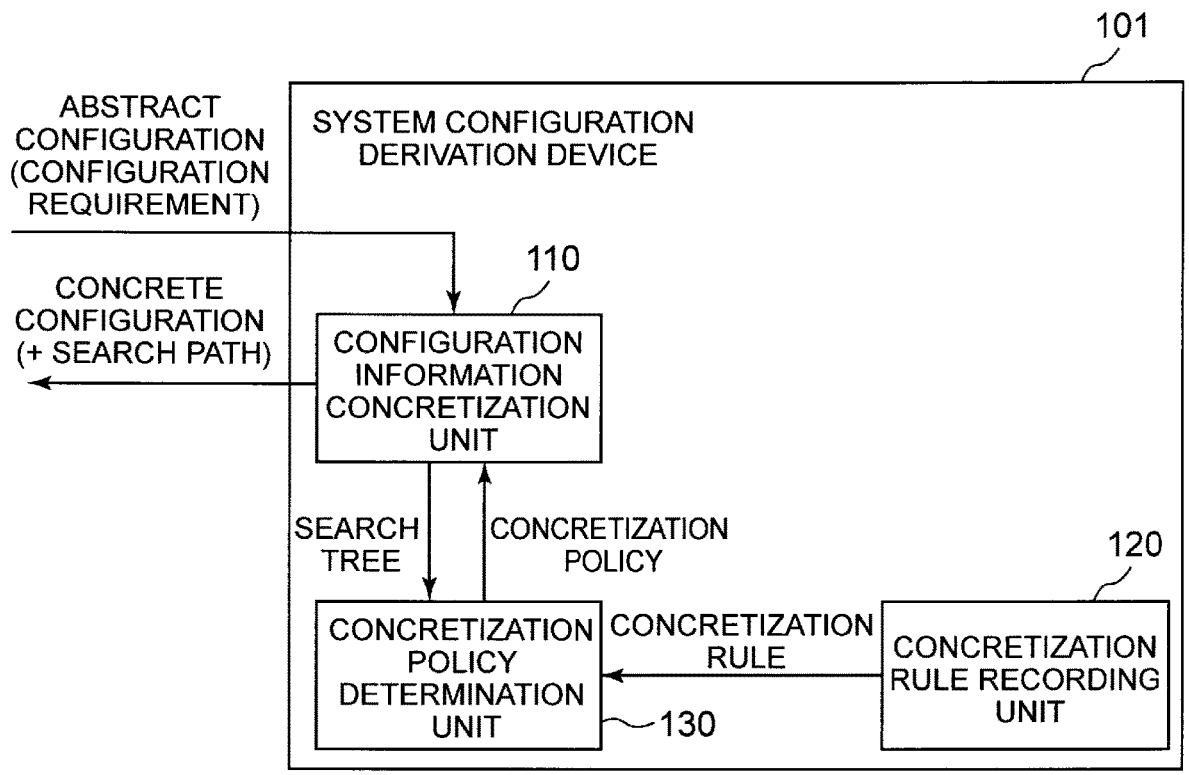

FIG. 14 is a block diagram showing a configuration example of a system configuration derivation device 101 in a second exemplary embodiment.

Figure 15:
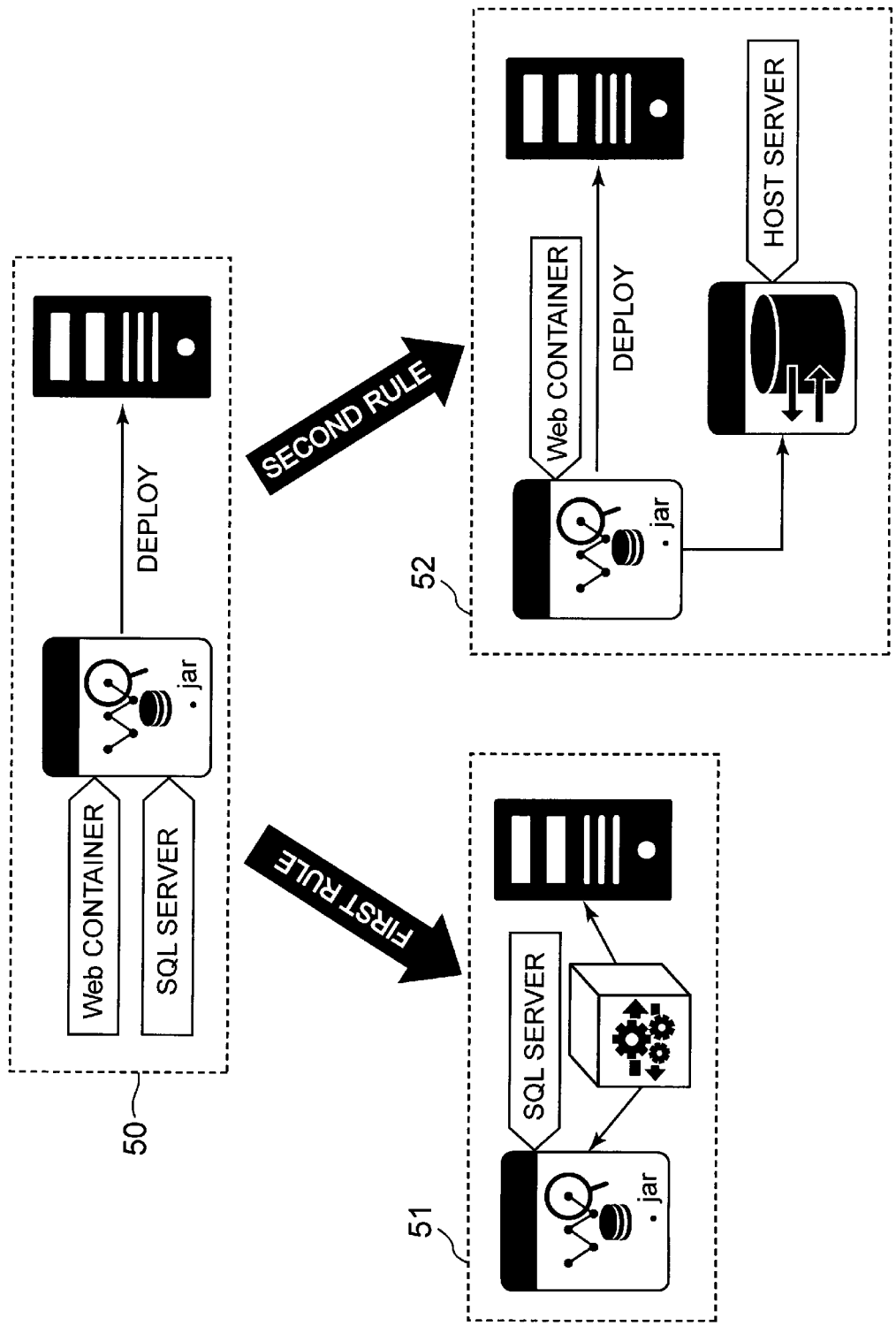

FIG. 15 is an explanatory diagram showing an example of a concretization policy generated by a concretization policy determination unit 130.

Figure 16:
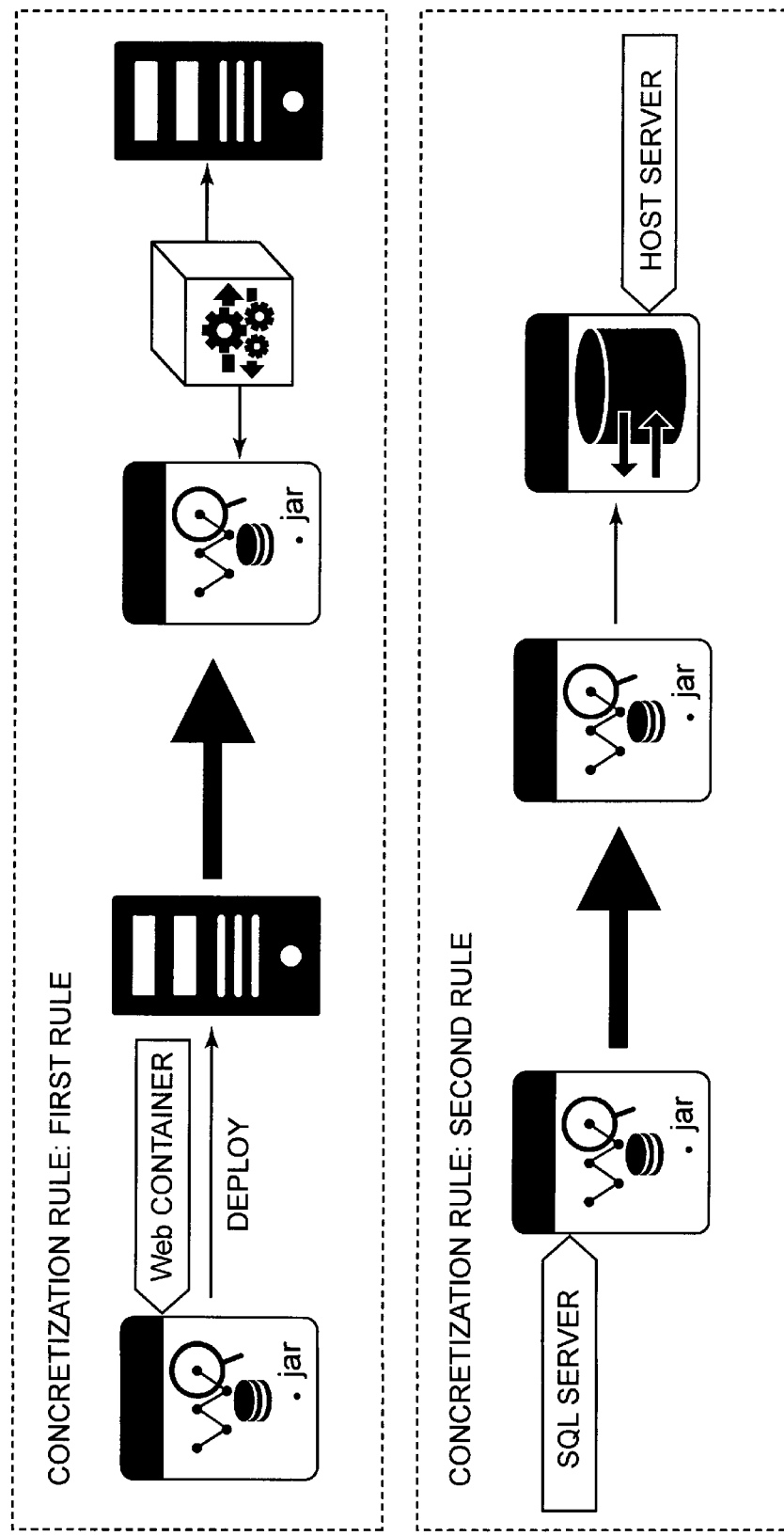

FIG. 16 is an explanatory diagram showing an example of a concretization rule recorded in a concretization rule recording unit 120.

Figure 17:
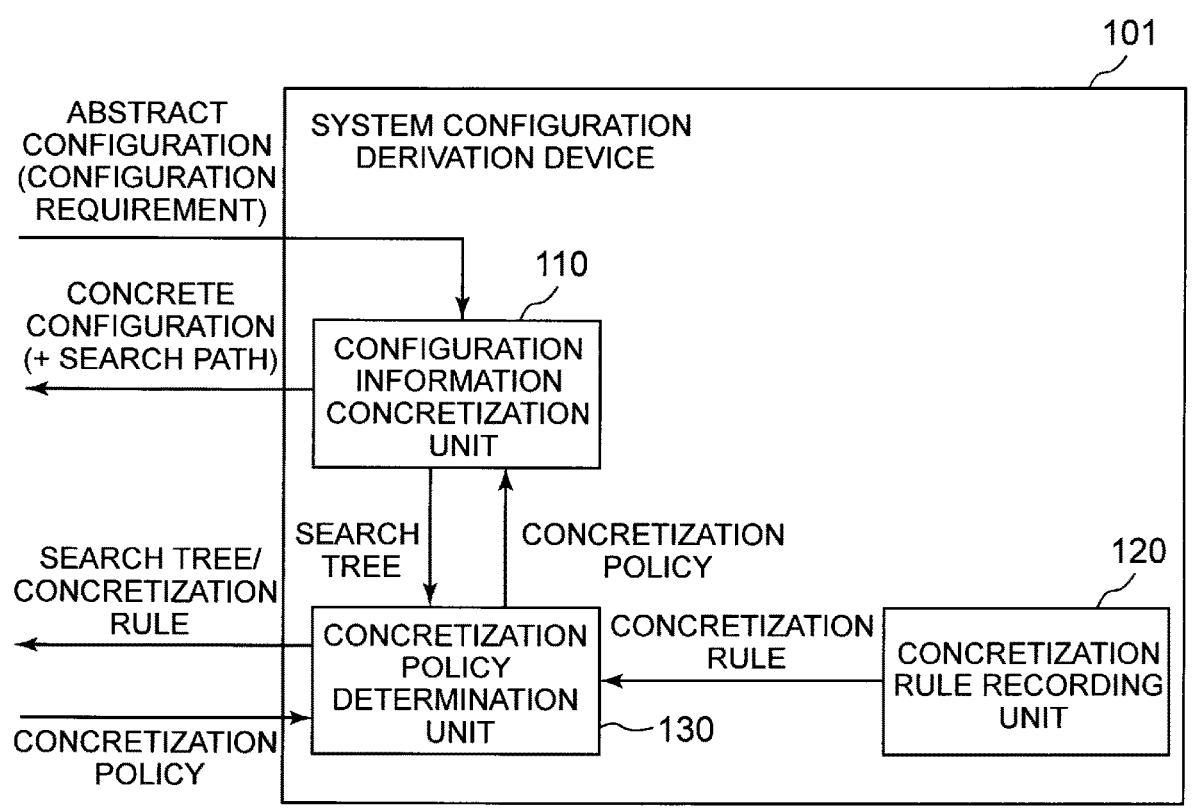

FIG. 17 is a block diagram showing another configuration example of the system configuration derivation device 101 in the second exemplary embodiment.

Figure 18:
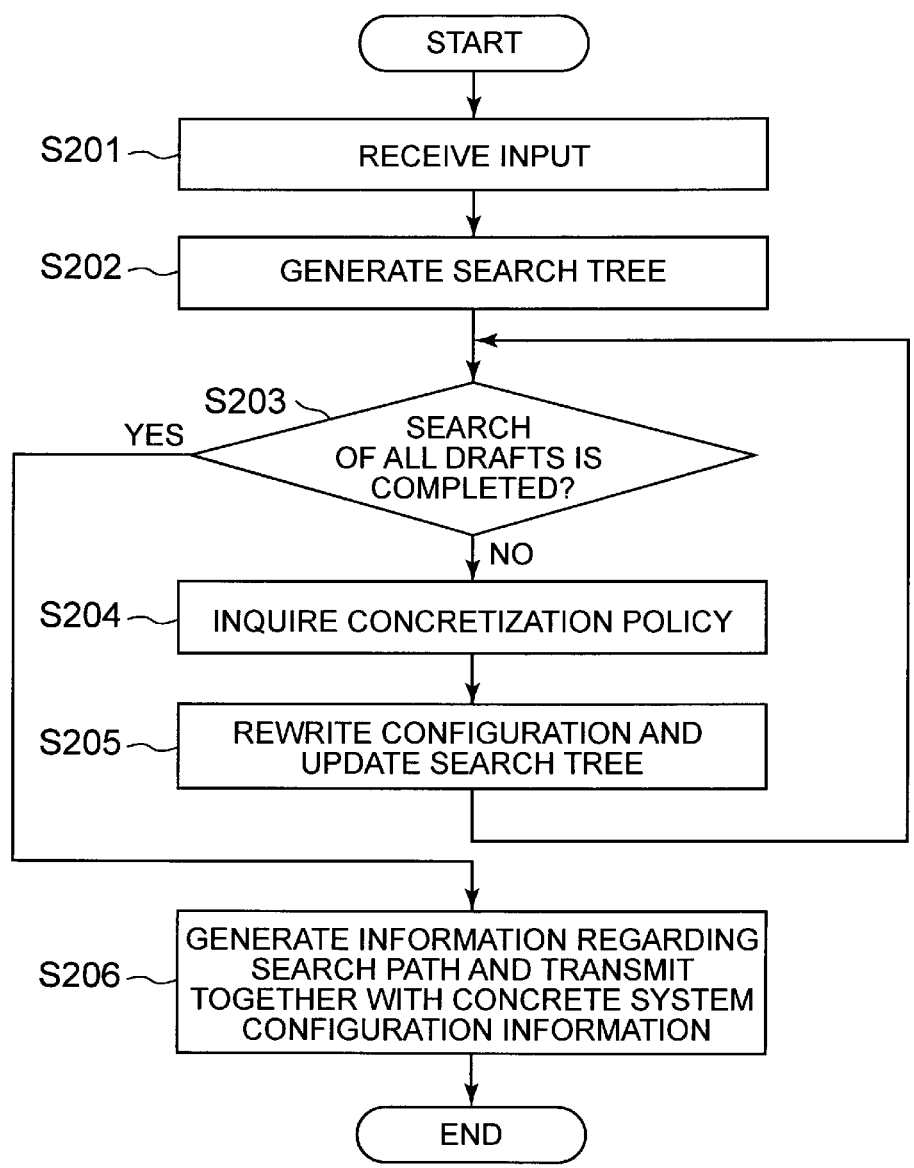

FIG. 18 is a flowchart showing an operation in a system configuration derivation process of the system configuration derivation device 101 in the second exemplary embodiment.

Figure 19:
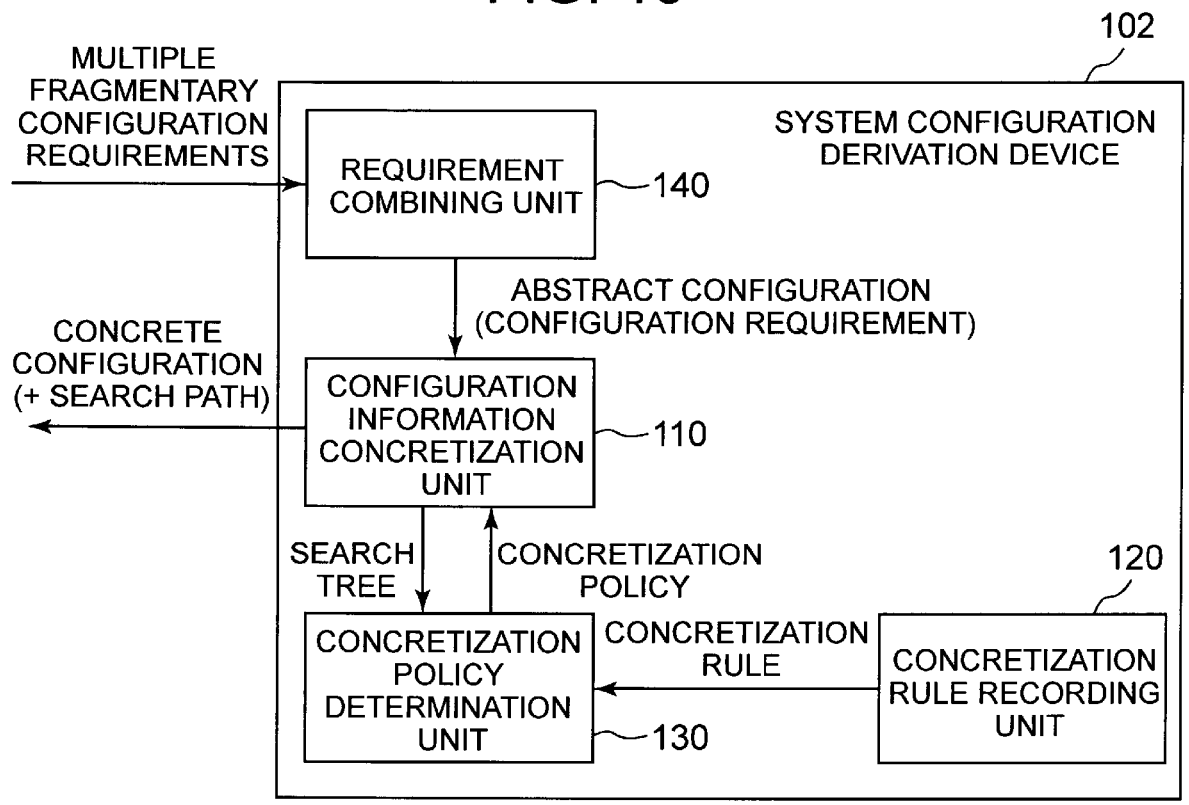

FIG. 19 is a block diagram showing a configuration example of a system configuration derivation device 102 in a third exemplary embodiment.

Figure 20:
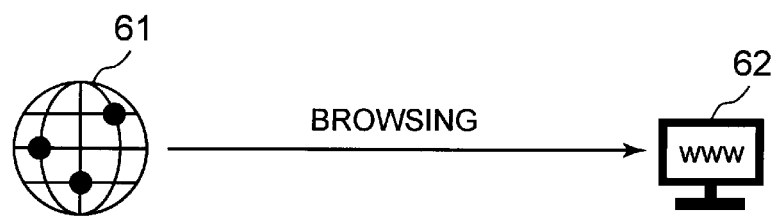

FIG. 20 is an explanatory diagram showing an example of a fragmentary configuration requirement input to a requirement combining unit 140.

Figure 21:
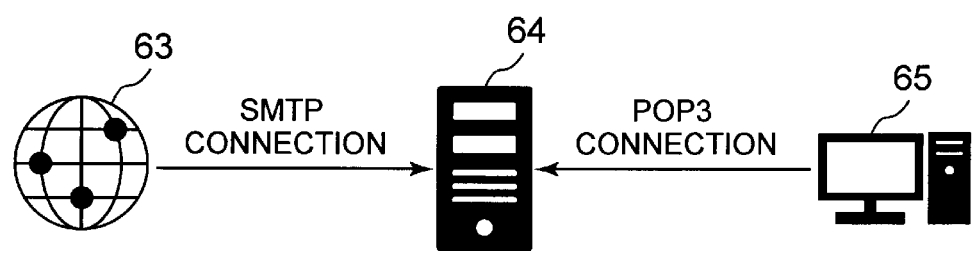

FIG. 21 is an explanatory diagram showing another example of the fragmentary configuration requirement input to the requirement combining unit 140.

Figure 22:
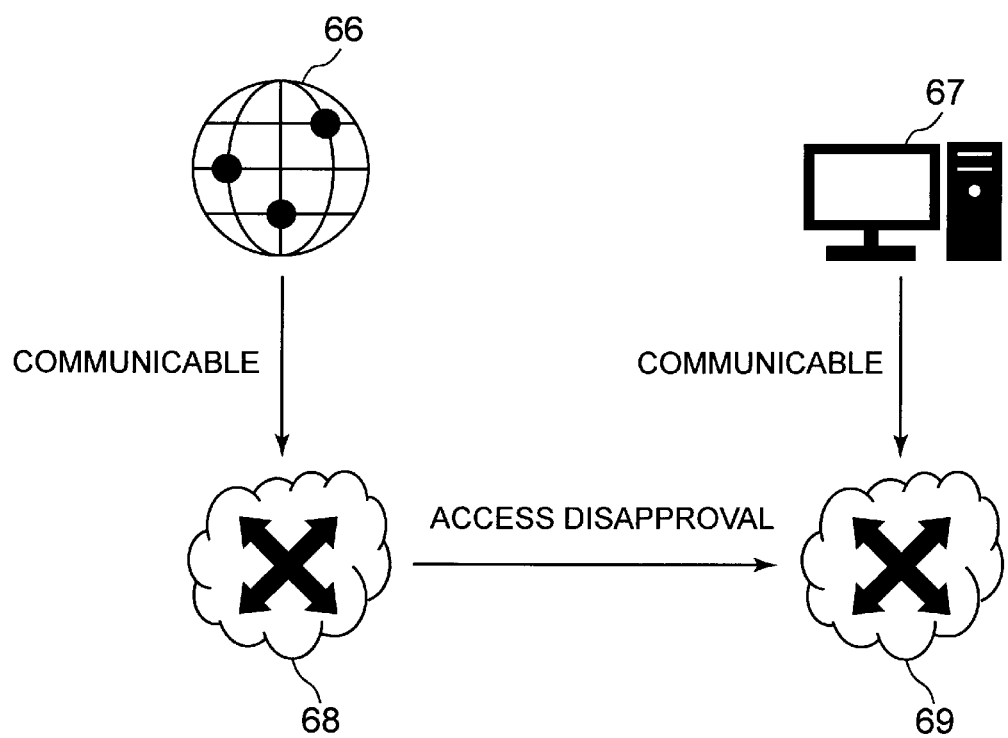

FIG. 22 is an explanatory diagram showing another example of the fragmentary configuration requirement input to the requirement combining unit 140.

Figure 23:
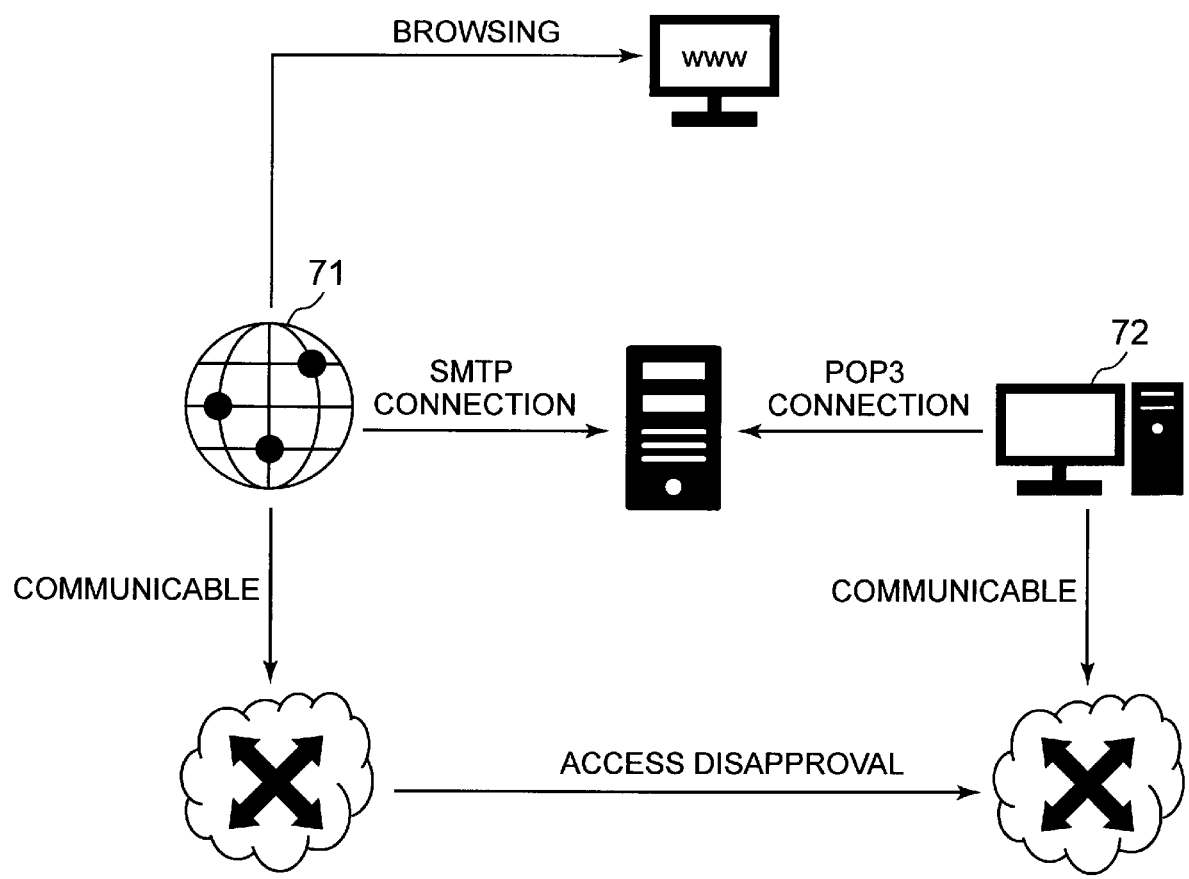

FIG. 23 is an explanatory diagram showing an example of a single configuration requirement output by the requirement combining unit 140.

Figure 24:
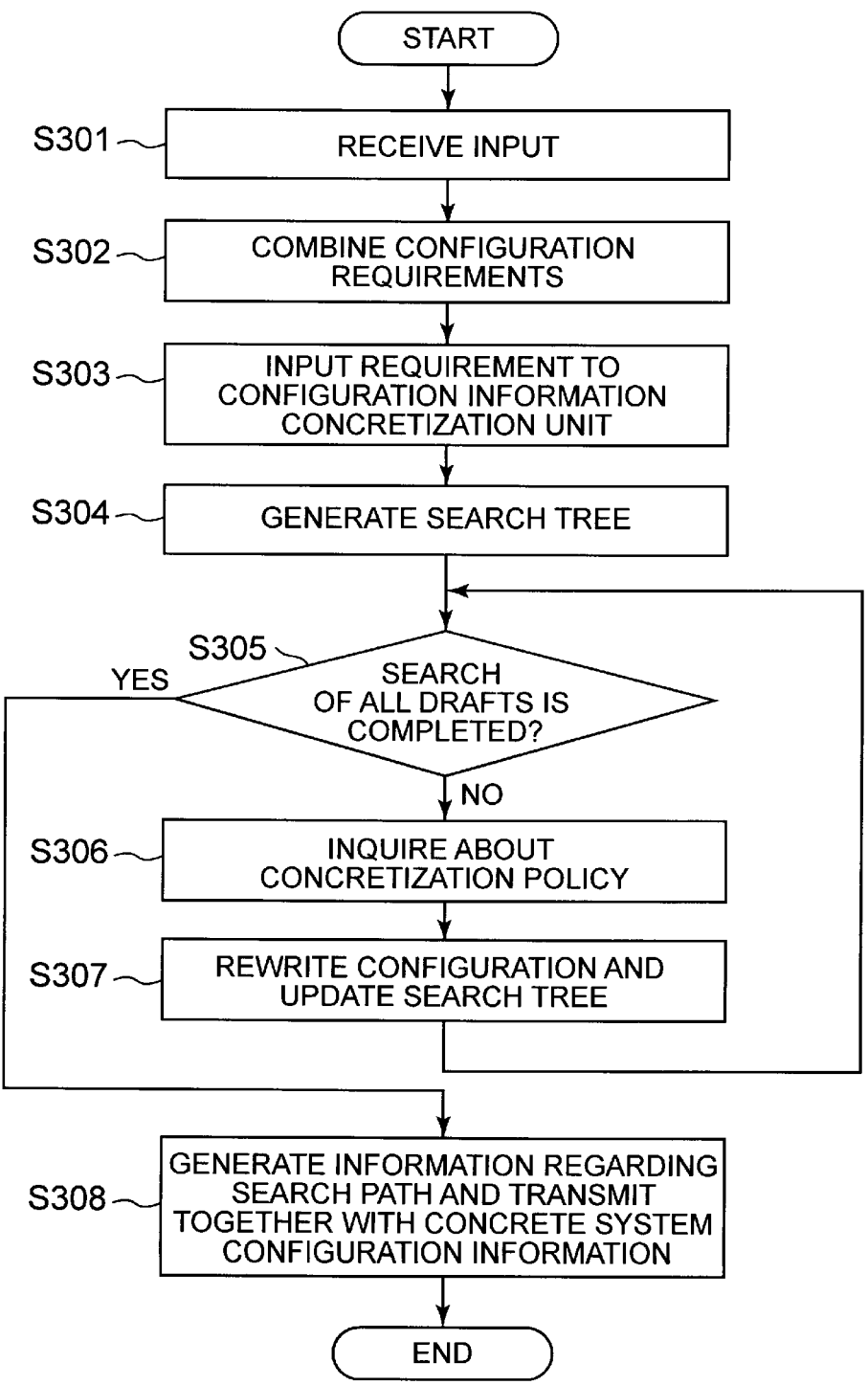

FIG. 24 is a flowchart showing an operation in a system configuration derivation process of the system configuration derivation device 102 in the third exemplary embodiment.

Figure 25:
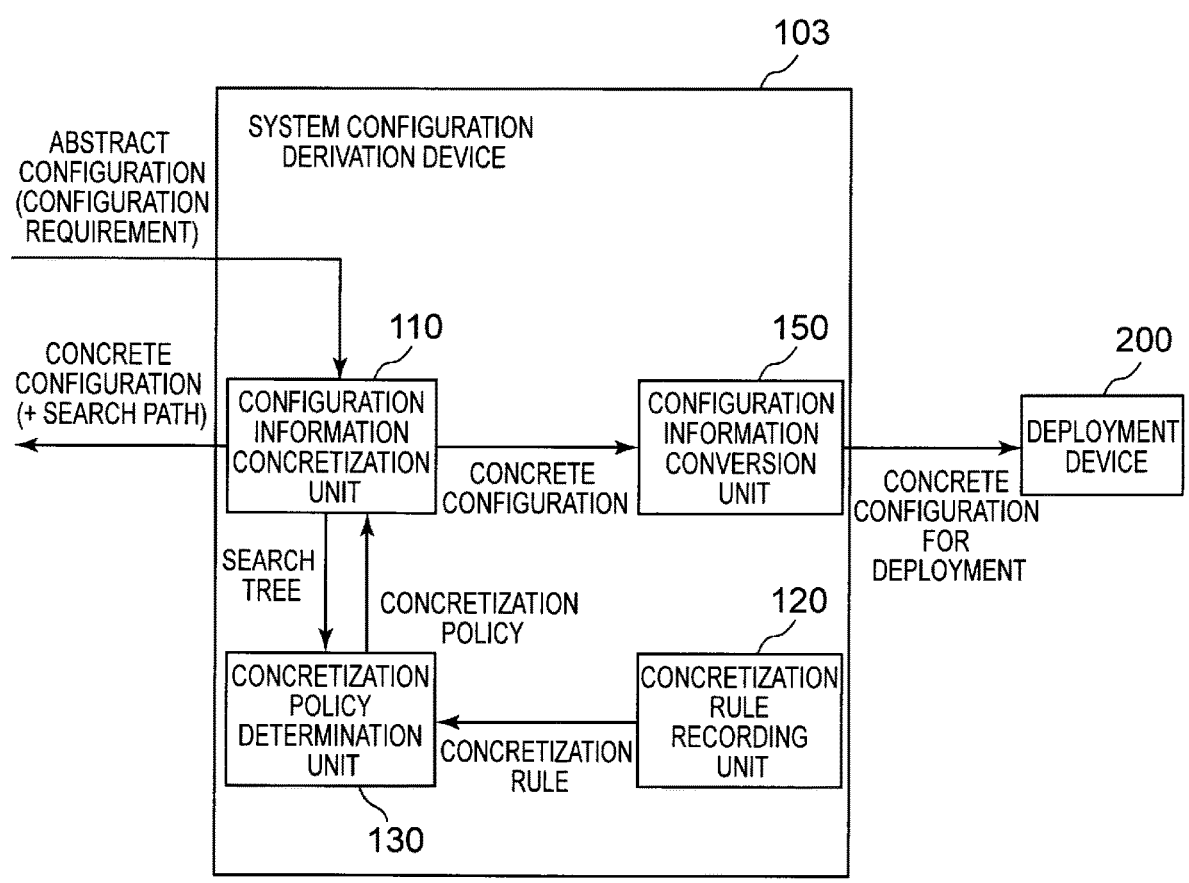

FIG. 25 is a block diagram showing a configuration example of a system configuration derivation device 103 in a fourth exemplary embodiment.

Figure 26:
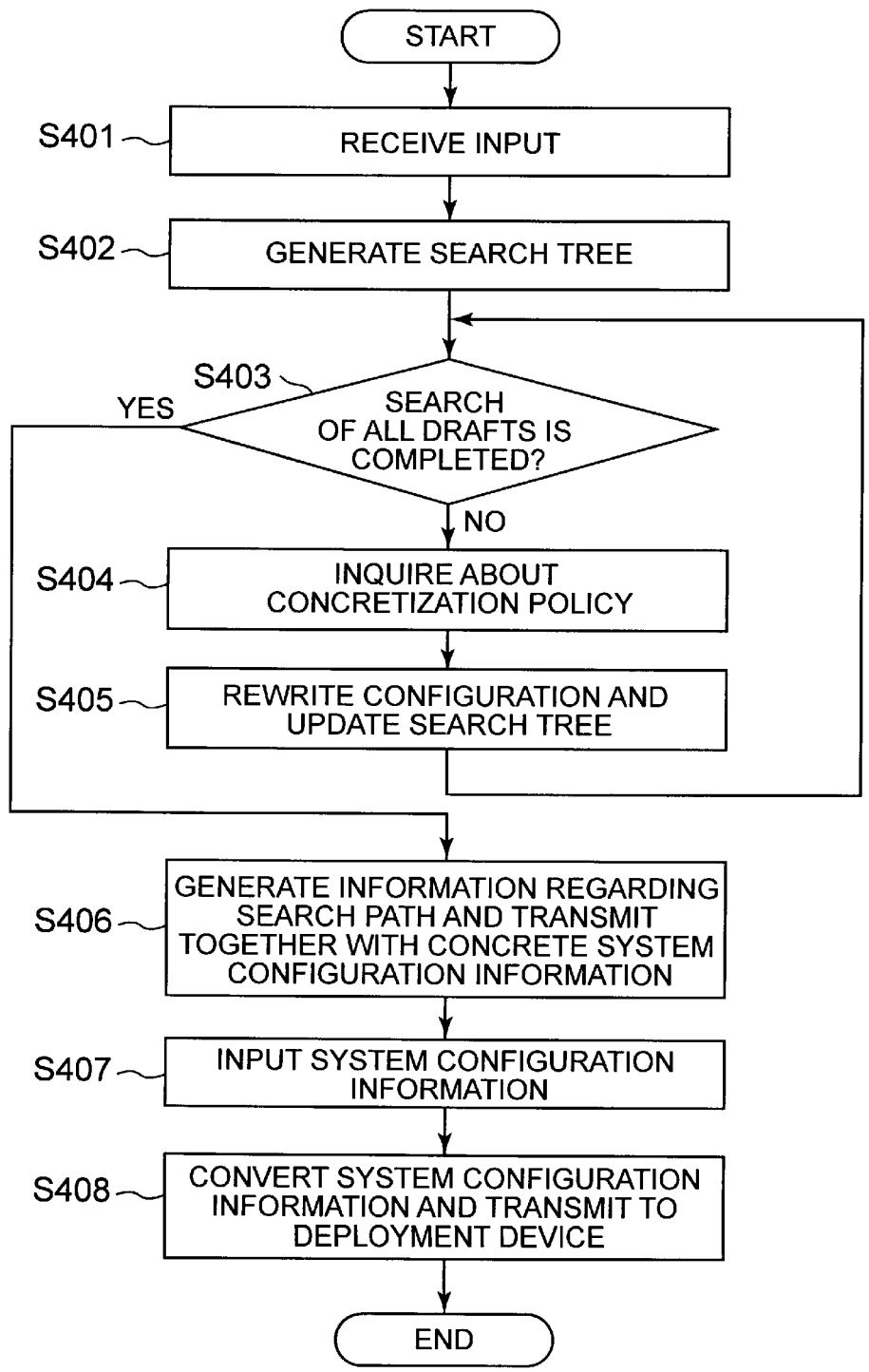

FIG. 26 is a flowchart showing an operation in a system configuration derivation process of the system configuration derivation device 103 in the fourth exemplary embodiment.

Figure 27:
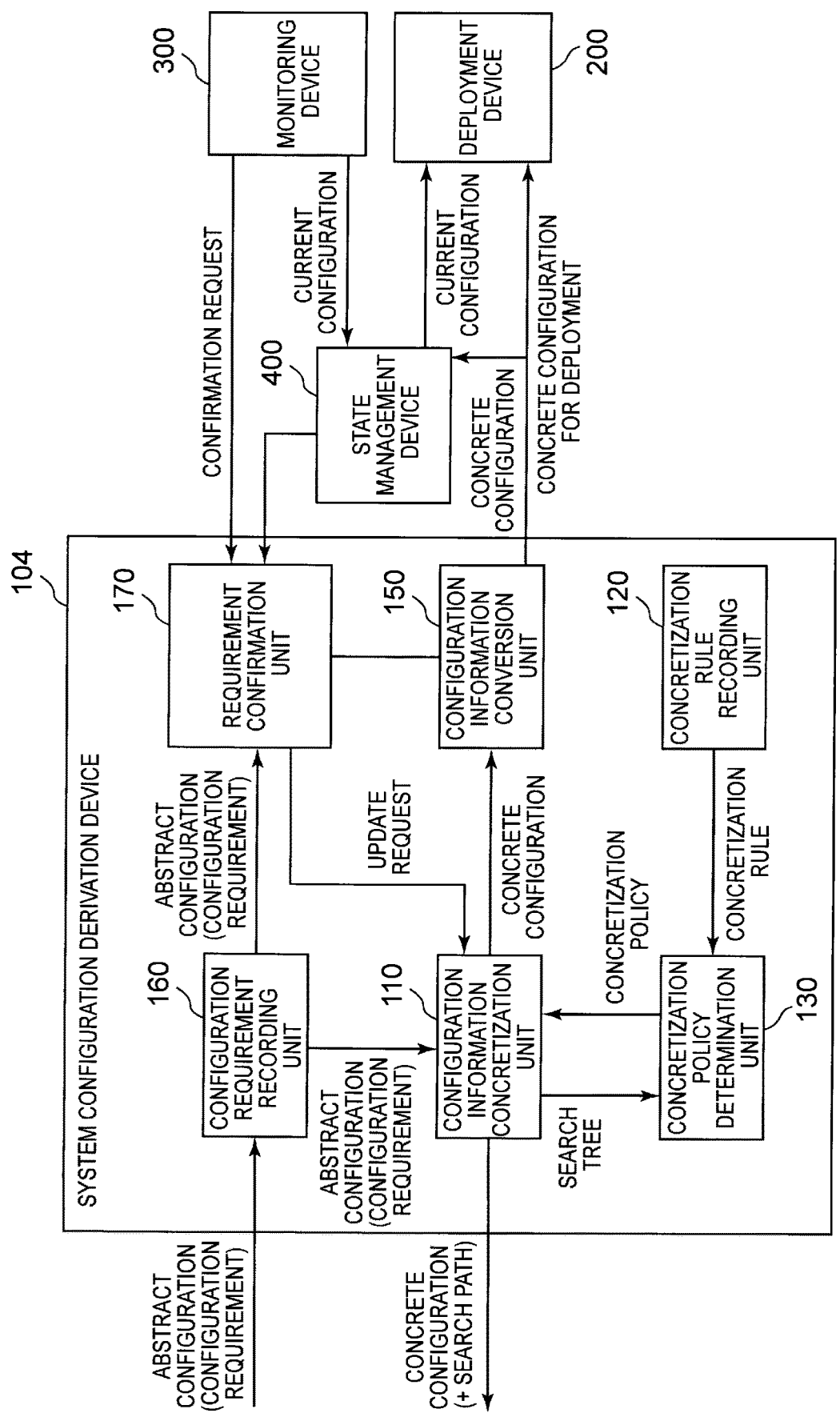

FIG. 27 is a block diagram showing a configuration example of a system configuration derivation device 104 in a fifth exemplary embodiment.

Figure 28:
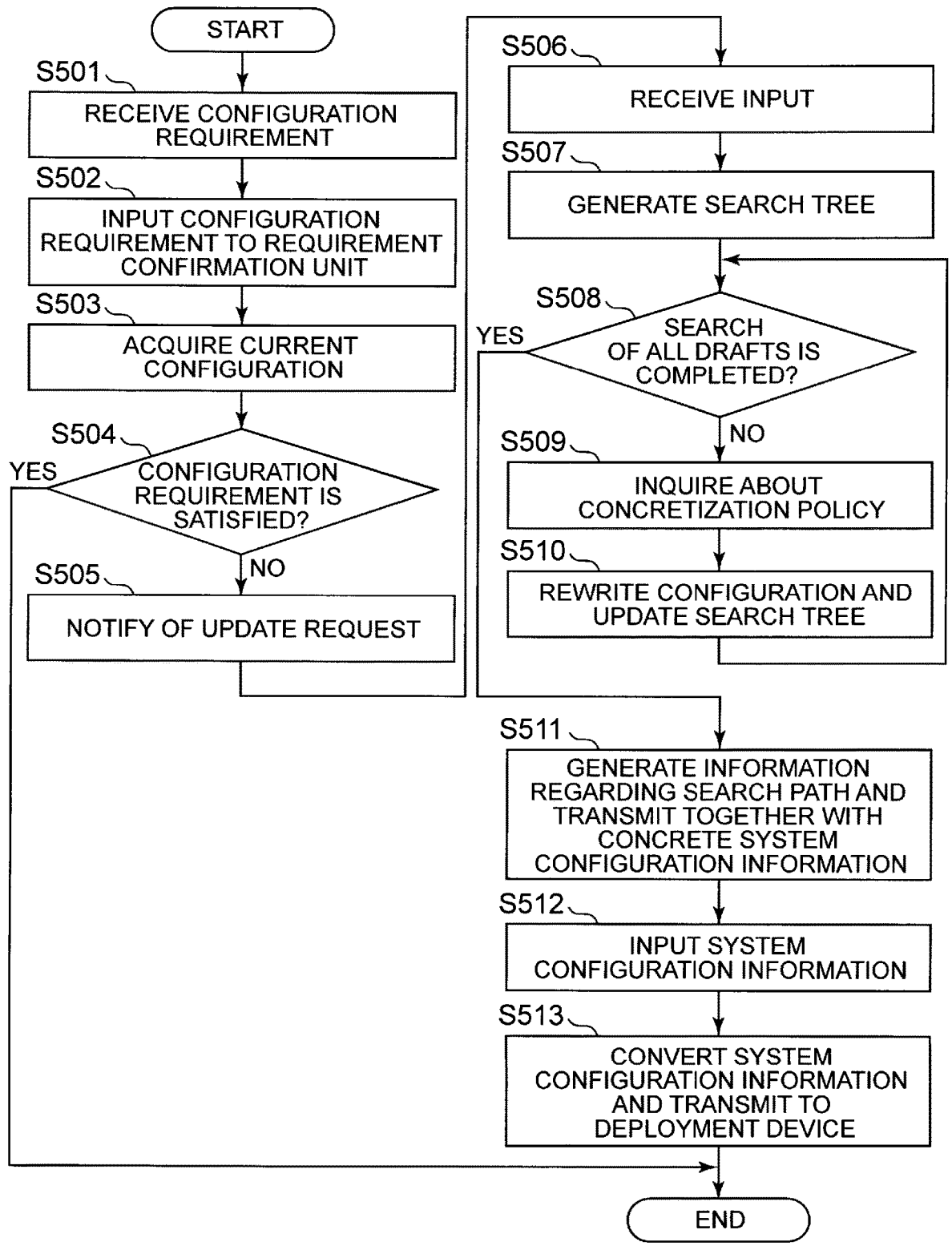

FIG. 28 is a flowchart showing an operation in a system configuration derivation process of the system configuration derivation device 104 in the fifth exemplary embodiment.

Figure 29:
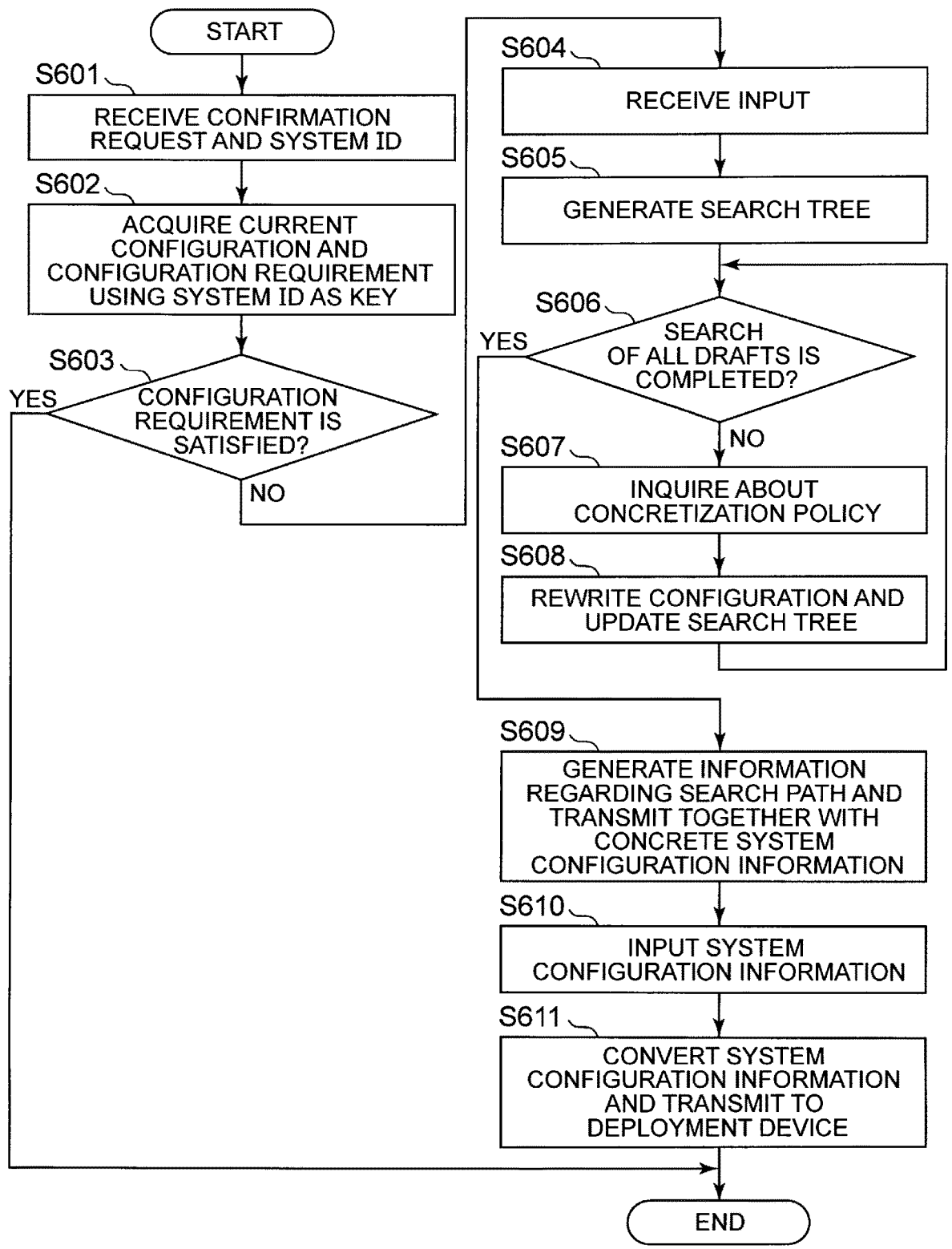

FIG. 29 is a flowchart showing another operation in the system configuration derivation process of the system configuration derivation device 104 in the fifth exemplary embodiment.

Figure 30:
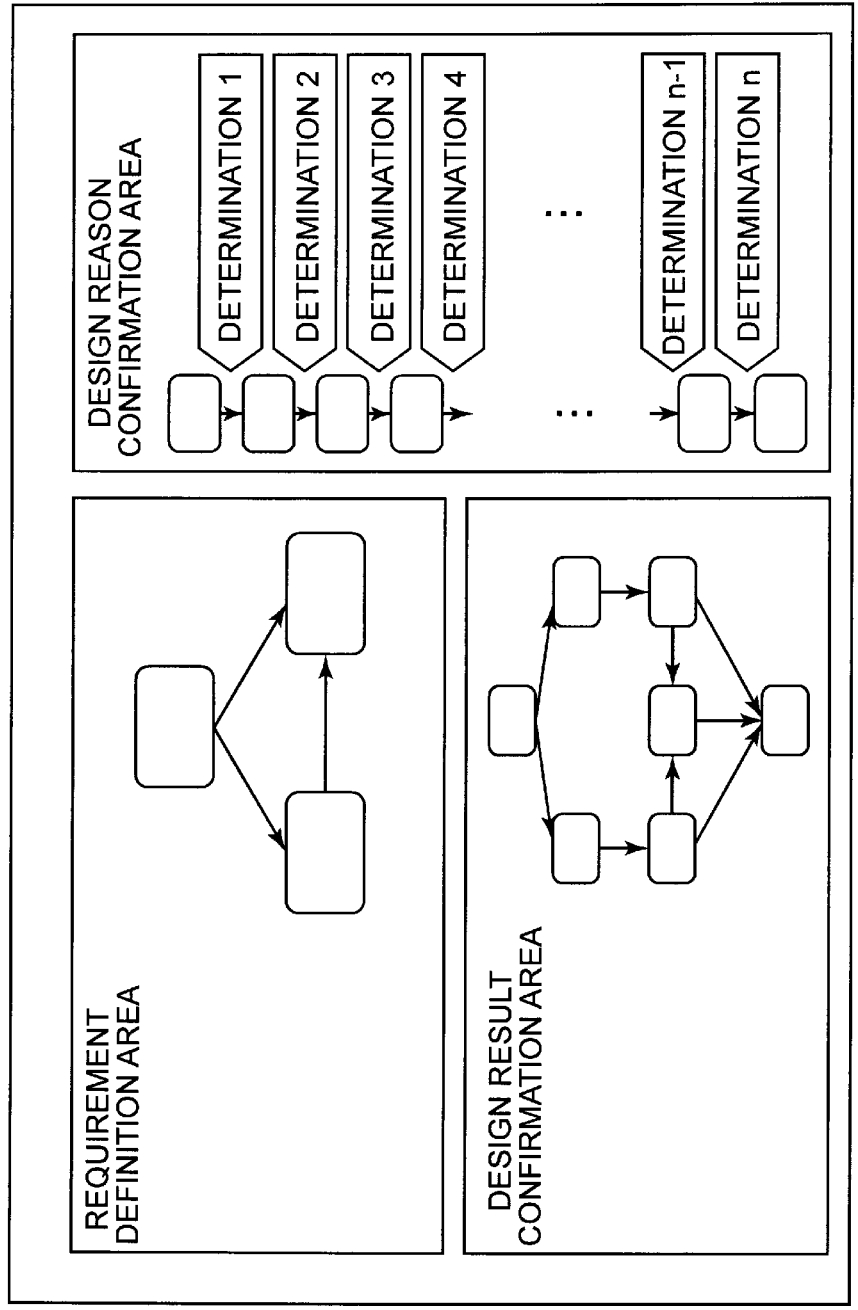

FIG. 30 is an explanatory diagram showing an example of a GUI provided in an input/output device in each exemplary embodiment.

Figure 31:
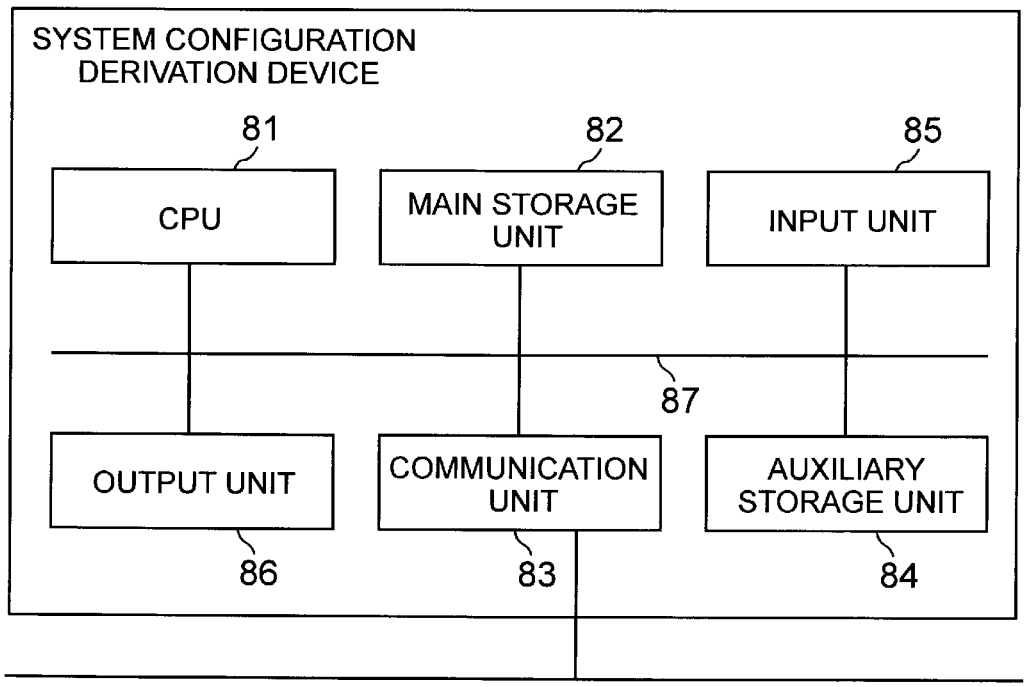

FIG. 31 is an explanatory diagram showing a hardware configuration example of a system configuration derivation device to which each exemplary embodiment of the present invention is applicable.

Figure 32:
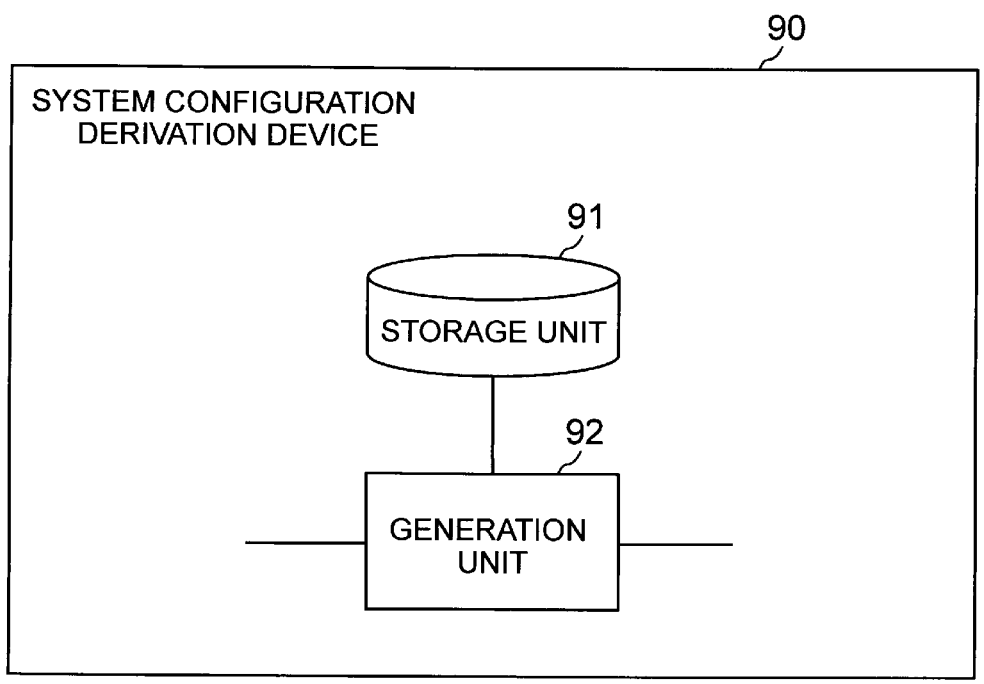

FIG. 32 is a block diagram showing an outline of the system configuration derivation device according to the present invention.

DESCRIPTION OF EMBODIMENTS

First Exemplary Embodiment

Figure 1:
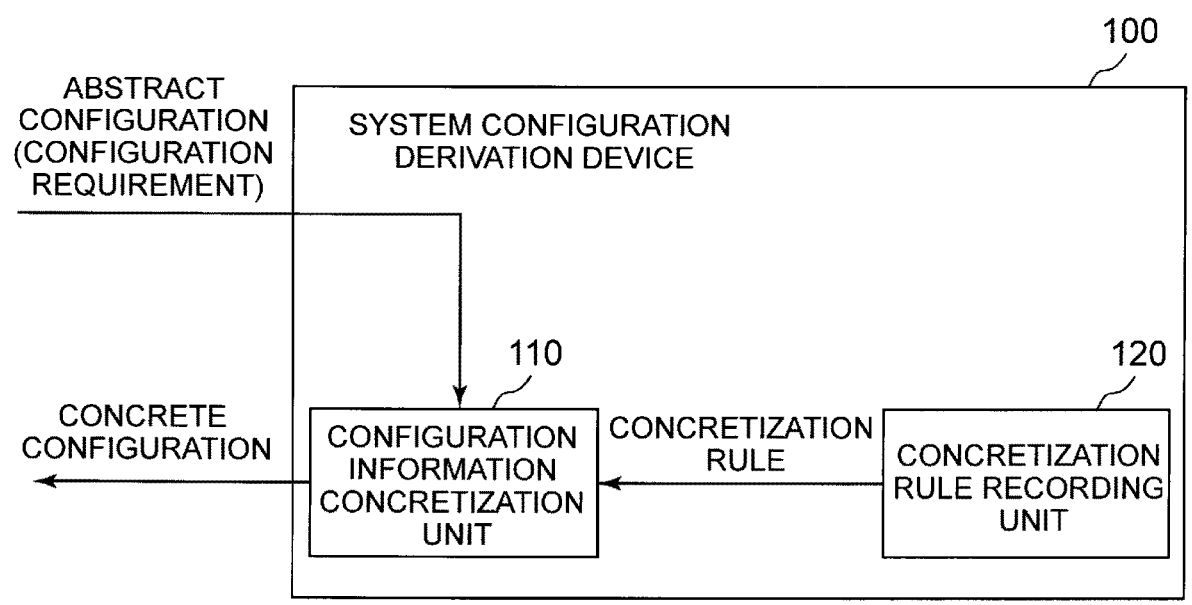
FIG. 1 is a block diagram showing a configuration example of a system configuration derivation device in a first exemplary embodiment of the present invention.

[Description of Configuration] Hereinafter, exemplary embodiments of the present invention will be described with reference to the drawings. FIG. 1 is a block diagram showing a configuration example of a system configuration derivation device in a first exemplary embodiment of the present invention.

A system configuration derivation device 100 in the present exemplary embodiment effectively reuses past development assets in computer computation processing to efficiently design the configuration of an ICT system.

In addition, the system configuration derivation device 100 in the present exemplary embodiment selects a rewriting rule applicable to the base configuration including unconfirmed portions and repeats the trial of applying the selected rule to output the configuration in which all the unconfirmed portions are determined as a design result.

In addition, the system configuration derivation device 100 in the present exemplary embodiment can derive the configuration of the ICT system satisfying a plurality of desired requirements without constraints on the derivable configuration.

As shown in FIG. 1, the system configuration derivation device 100 in the present exemplary embodiment includes a configuration information concretization unit 110 and a concretization rule recording unit 120. The configuration information concretization unit 110 is communicatively connected to the concretization rule recording unit 120 via a communication network or the like.

The configuration information concretization unit 110 is also communicatively connected to an external input/output device (not shown) of the system configuration derivation device 100 via a communication network or the like. The configuration information concretization unit 110 receives, from a user, an input of a configuration requirement described as an abstract configuration via the input/output device.

The configuration information concretization unit 110 has a function of converting the input abstract configuration into concrete system configuration information. Then, the configuration information concretization unit 110 outputs the converted system configuration information to the user via the input/output device.

The concretization rule recording unit 120 has a function of readably recording a concretization rule, which is a rule for rewriting of configuration information performed in concretization of an abstract configuration. The configuration information concretization unit 110 acquires the concretization rule from the concretization rule recording unit 120.

Then, the configuration information concretization unit 110 uses the acquired concretization rule in a process for converting the input configuration requirement (abstract configuration) into concrete system configuration information. Note that, the configuration information concretization unit 110 may record the concretization rule in the concretization rule recording unit 120.

The configuration requirement includes at least one abstract component or the relationship between abstract components. Each component or the relationship between components includes an arbitrary number of requirements or constraint conditions regarding the peripheral connected configuration.

The concretization rule defines a method of converting abstract configuration information, which is information indicating an abstract configuration, into more concrete abstract configuration information. The abstract configuration information represents a plurality of abstract components or the relationship between the components, or a plurality of concrete components or the relationship between the components.

Note that, the concretization rule may not necessarily define a method for completely concretizing all constituent elements. For example, the abstract configuration after being concretized in accordance with the concretization rule may still include an abstract constituent element.

The abstract configuration and the data format of the abstract configuration in the present exemplary embodiment will be described. The abstract configuration is information representing an intention regarding the configuration of a system or the like desired by an arbitrary subject.

The abstract configuration in the present exemplary embodiment is represented in a graph consisting of nodes and edges. A node represents an intention regarding any component. An edge represents an intention regarding the relationship between components.

The node type and attribute information are attached to each node. The edge type and attribute information are attached to each edge. When the type and attribute information are attached, the intention of the node or edge is more specifically represented.

The abstract configuration in the present exemplary embodiment includes, as one piece of the information defined as a type, information regarding the type of a connectable relationship. For example, in an application-server-middleware-type component, the HostedOn type, which is the relationship when connecting to the computer resource required for the application server middleware to operate, is specified as the type of a connectable relationship.

When the HostedOn type is specified as the type of the connectable relationship, the application-server-middleware-type node can connect to the computer resource via the HostedOn-type edge. The application-server-middleware-type node is considered to be unconnectable to the components indicating the relationship that is not specified as the type.

Next, the conditions for a node or an edge to be concrete will be described. The first condition for a node or an edge to be concrete is that information indicating being concrete is attached to the node type or the edge type.

For example, an application-server-middleware-type node represents a category of software having a specific function and is an abstract component. Thus, information indicating being concrete is not specified in the application-server-middleware type.

When a component indicates a product having a specific model number, such as Apache Tomcat (registered trademark) version 7.0, information indicating being concrete is specified in the component type.

In addition, there is, for example, a Connected type indicating virtual machines can communicate with each other via a communication network as a type of the relationship for connecting two virtual machines, but information indicating being concrete is not specified in the Connected type.

This is because that two virtual machines are required to belong to a communication network via the network interface cards (NICs) provided in both virtual machines in order for the two virtual machines to be communicable with each other via the communication network. Furthermore, the communication network to which the virtual machines belong is required to be the same communication network or to be different communication networks communicably connected via a router or the like.

That is, the Connected type is an abstract relationship in which a plurality of components is intended to be appropriately configured, and thus information indicating being concrete is not specified. However, the above HostedOn type directly represents the relationship between any two components, and is not interpreted as other relationships, and thus information indicating being concrete is specified.

The second condition for a node or an edge to be concrete is that other constituent elements required to be connected are not specified, or other constituent elements required to be connected are properly connected although specified.

For example, the existence of the application server middleware requires that the application server middleware be hosted by any computer resource. Thus, in the application-server-middleware type, information indicating that connection with the HostedOn type node is possible and information indicating that connection with the HostedOn type node is required are specified.

The system configuration derivation device 100 in the present exemplary embodiment regards, when each element is concrete and the required connection is made, the system configuration including each element as being concrete on the basis of the information described in the types of the components or the types of relationships. In addition, when all the elements included in the abstract configuration are concrete, the system configuration derivation device 100 regards the abstract configuration as concrete system configuration information.

Next, a description method of the concretization rule in the present exemplary embodiment will be described. The definition of the concretization rule in the present exemplary embodiment is constituted by information indicating the configuration of a part to be concretization target and information indicating the configuration after the target part is concretized.

Thus, the configuration information concretization unit 110 concretizes a certain partial configuration by rewriting the partial configuration included in the abstract configuration and represented by the information indicating the configuration of the concretization target part into the configuration represented by the information indicating the configuration after the target part is concretized. In many cases, the constituent elements of the partial configuration after concretization are more than the constituent elements of the partial configuration before concretization.

The type of the configuration of the concretization target part in the concretization rule is the type of a single constituent element or the type of relationship. The type of the configuration of the concretization target part may be a type of another pattern. In addition, there may be a plurality of concretization rules having the same information indicating the configuration of the concretization target part. With the above configuration, the system configuration derivation device 100 in the present exemplary embodiment can generate a plurality of various concretization results.

For example, as a part of the concretization rule, it may be specified to attach detailed information indicating a constraint condition or the like to the concretized abstract configuration. In the following, an example in which a constraint condition is attached to the concretized abstract configuration will be described.

Figure 2:
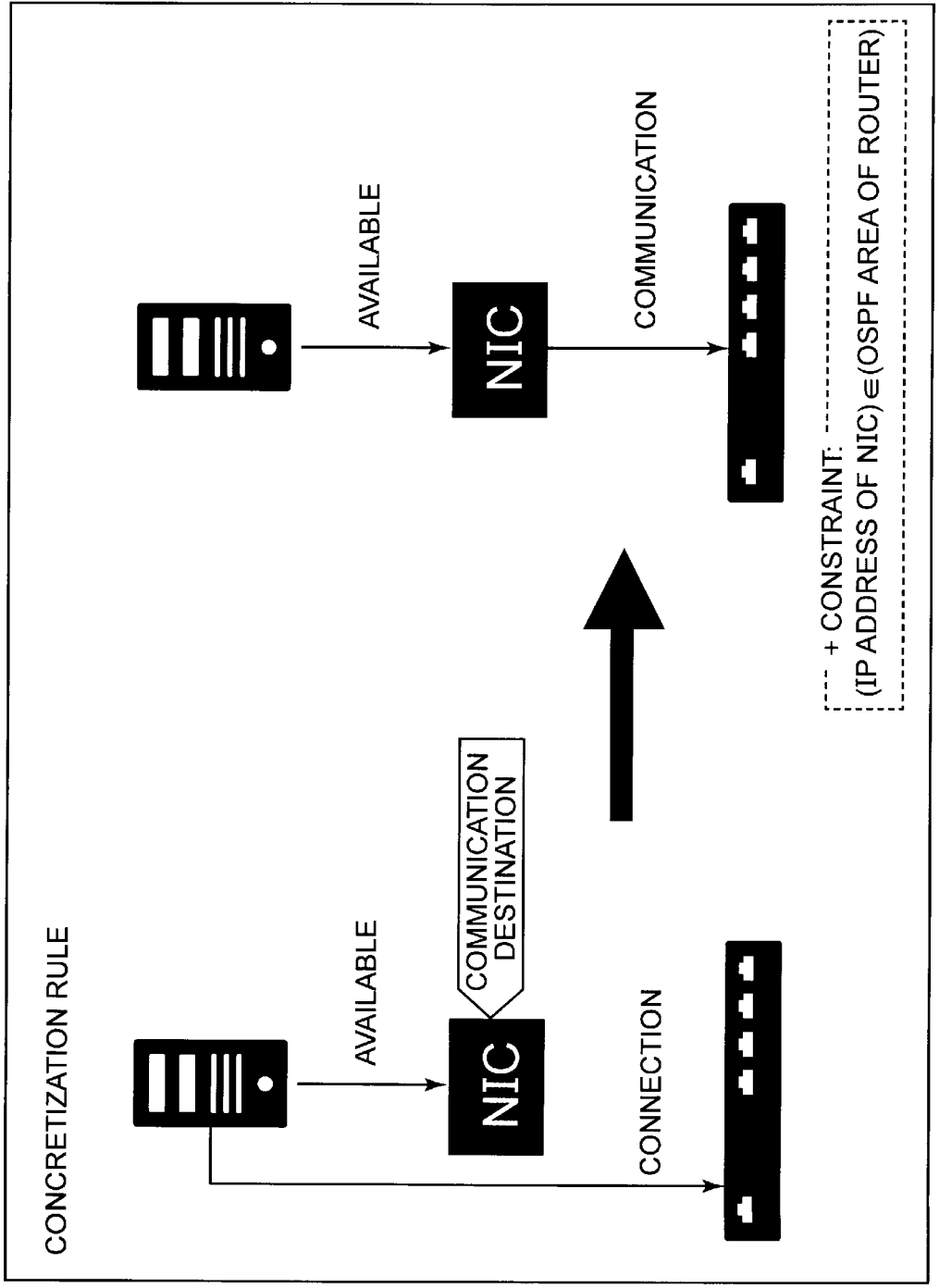
FIG. 2 is an explanatory diagram showing an example of a concretization rule specifying that a constraint condition is attached to a concretized abstract configuration.

FIG. 2 is an explanatory diagram showing an example of a concretization rule specifying that a constraint condition is attached to the concretized abstract configuration. The concretization rule shown in FIG. 2 is a rule for concretizing a "connection" requirement between the server and the router that use an NIC by connecting the NIC to the router to allow the router to transmit and receive packets to and from the NIC. The left configuration shown in FIG. 2 is an abstract configuration before concretization. The right configuration shown in FIG. 2 is the abstract configuration after concretization.

In order for the router to transmit and receive packets to and from the NIC, the Internet Protocol (IP) address allocated to the NIC shown in FIG. 2 is required to be a value that matches the Open Shortest Path First (OSPF) area allocated to the router.

In other words, it is required to attach the constraint "(IP address of NIC)∈(OSPF area of router)" representing the above to the concretized abstract configuration. For the above reason, the concretization rule shown in FIG. 2 specifies that "a constraint is attached to the concretized abstract configuration".

Figure 3:
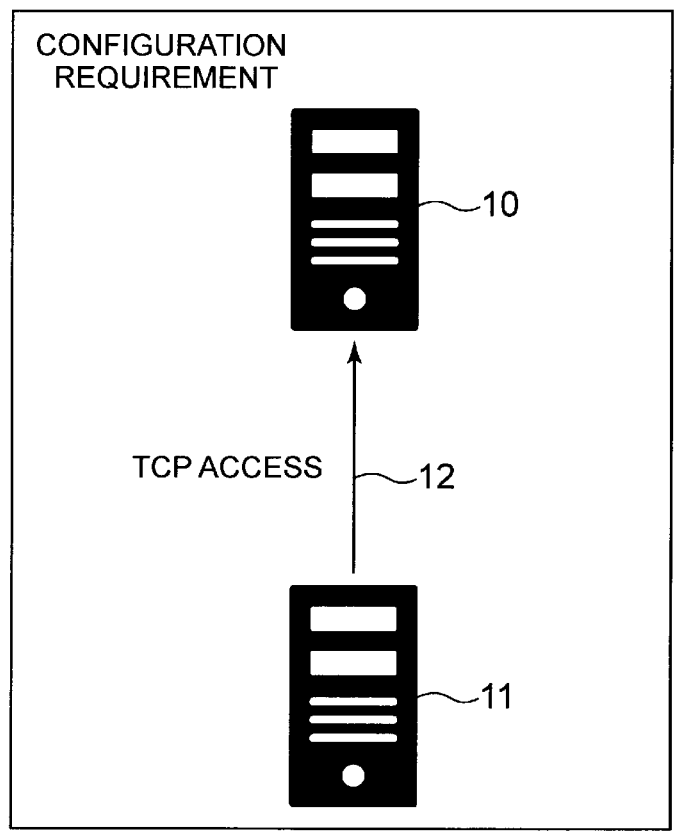
FIG. 3 is an explanatory diagram showing an example of a configuration requirement.

Next, an example of a configuration requirement (abstract configuration) will be described with reference to FIGS. 3 to 5. FIG. 3 is an explanatory diagram showing an example of a configuration requirement. FIG. 3 shows the requirement regarding the relationship between two constituent elements.

The configuration requirement shown in FIG. 3 is constituted by a constituent element 10, a constituent element 11, and an arrow 12. The arrow 12 is specified from the constituent element 11 to the constituent element 10 and having the label "TCP access".

The constituent elements 10 and 11 shown in FIG. 3 are constituent elements of a system. The arrow 12 shown in FIG. 3 indicates the "TCP access" requirement from the constituent element 11 to the constituent element 10.

The requirement indicated by the arrow 12 shown in FIG. 3 is that "when the constituent element 11 transmits an appropriate TCP packet from an appropriate port, the transmitted TCP packet is required to be properly delivered to the constituent element 10".

Figure 4:
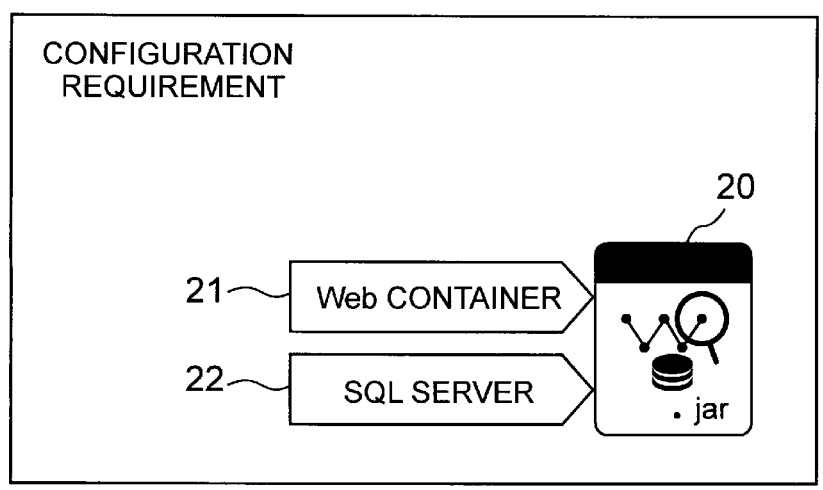
FIG. 4 is an explanatory diagram showing another example of the configuration requirement.

FIG. 4 is an explanatory diagram showing another example of the configuration requirement. FIG. 4 shows the requirement indicating that one constituent element requests a component required to operate itself normally.

The configuration requirement shown in FIG. 4 is constituted by one constituent element 20, a label 21 attached to the constituent element 20 and describing "Web container", and a label 22 describing "Structured Query Language (SQL) server".

The label directly attached to a constituent element indicates that the constituent element described on the label and the constituent element to which the label is attached are required to be connected in an appropriate relationship. For example, the constituent element 20 shown in FIG. 4 represents a Java (registered trademark) applet. That is, the configuration requirement shown in FIG. 4 indicates that the web container and the SQL server are required as components for the constituent element 20 to operate normally.

Figure 5:
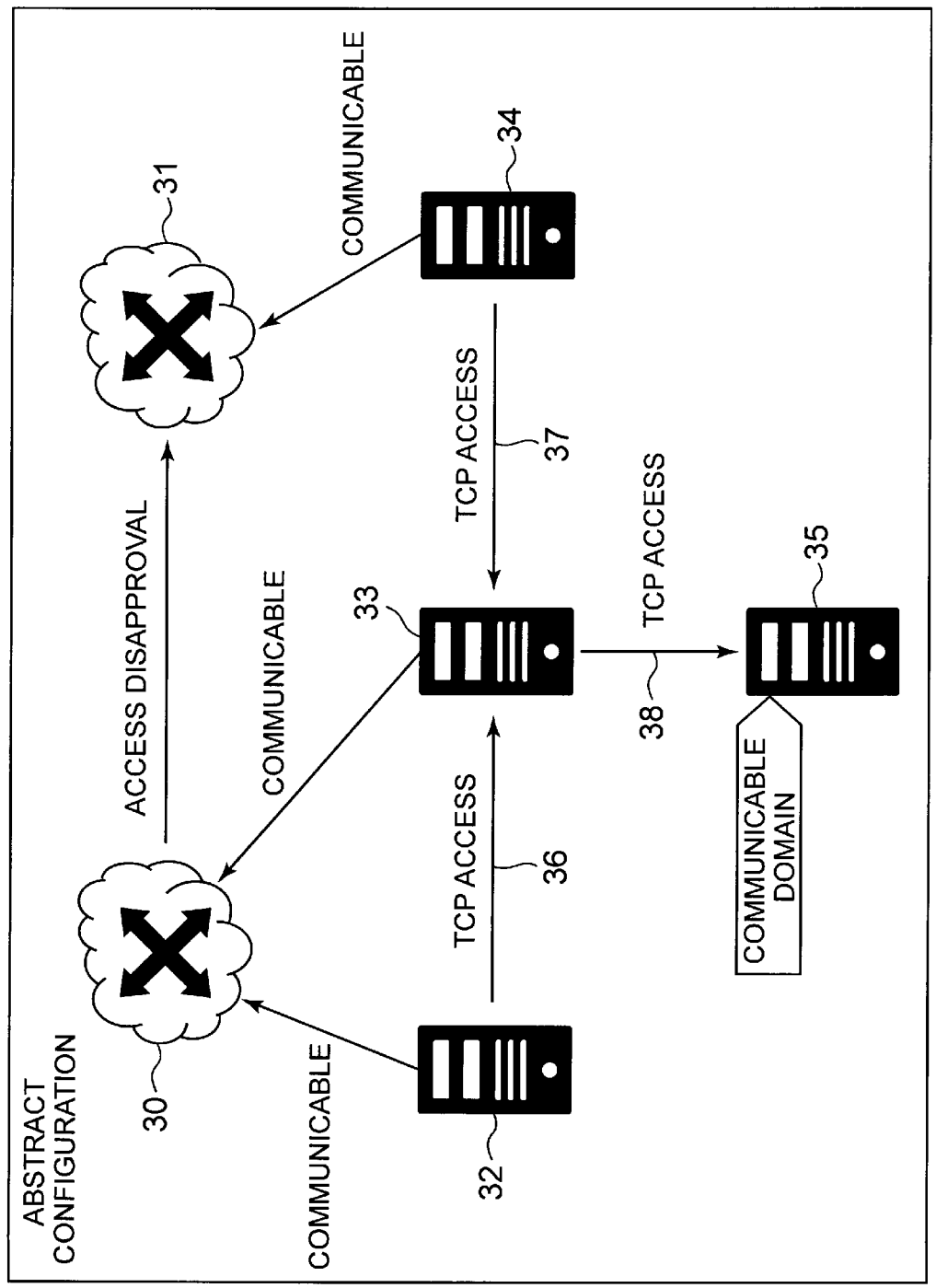
FIG. 5 is an explanatory diagram showing an example of an abstract configuration.

FIG. 5 is an explanatory diagram showing an example of an abstract configuration. The abstract configuration shown in FIG. 5 includes six constituent elements in total: a communicable domain 30, a communicable domain 31, a server 32, a server 33, a server 34, and a server 35.

Each communicable domain shown in FIG. 5 is not a physical object but a concept that represents "the whole group of communicably connected communication devices that can transfer packets". The communicable domain itself is not concretized as a component.

However, if a communicable domain is used, a concretization method, such as "applying only to two (communicable) components belonging to the same communicable domain", "making two components belong to different communicable domains", or the like, can be described in a concretization rule. That is, it becomes possible to describe a requirement regarding the communicable range of the system.

As shown in FIG. 5, a "communication" requirement is specified from each of the server 32 and the server 33 to the communicable domain 30. In addition, a "communication" requirement is specified from the server 34 to the communicable domain 31.

Furthermore, as shown in FIG. 5, a "TCP access" requirements shown in FIG. 3 are specified from each of the server 32 and the server 34 to the server 33. In addition, an "access disapproval" requirement is specified from the communicable domain 30 to the communicable domain 31. Among the requirements shown in FIG. 5, the "TCP access" requirement is an abstract requirement. The requirements other than the "TCP access" requirement shown in FIG. 5 are concrete requirements.

Figure 6:
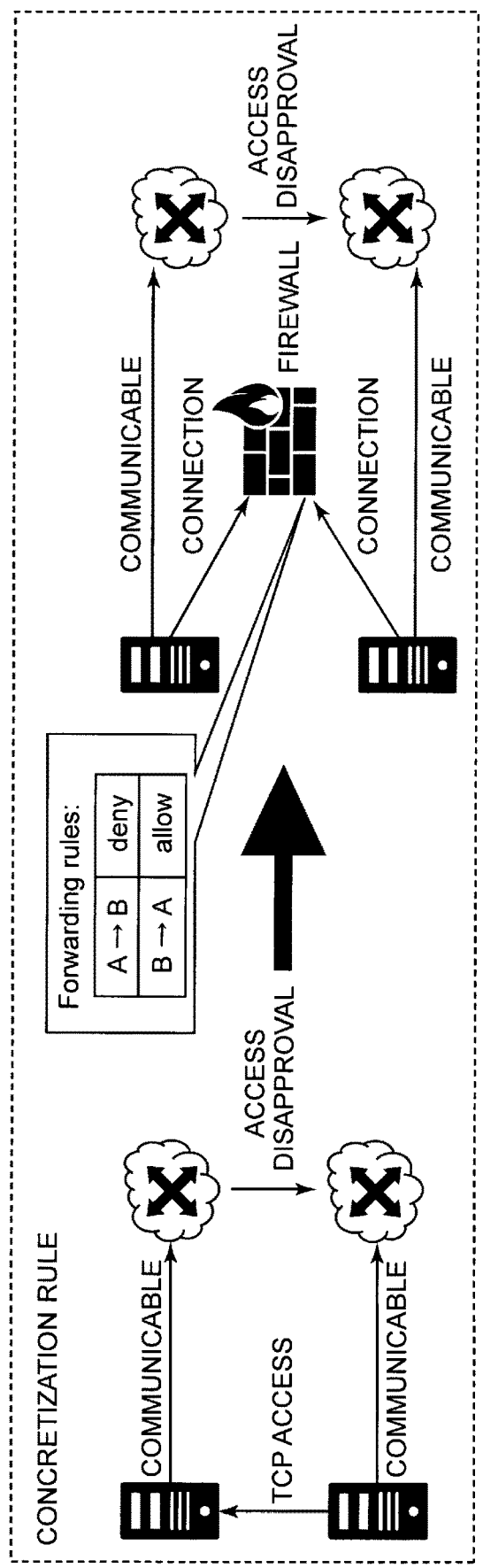
FIG. 6 is an explanatory diagram showing an example of a concretization rule for concretizing a "transmission control protocol (TCP) access" requirement.
Figure 7:
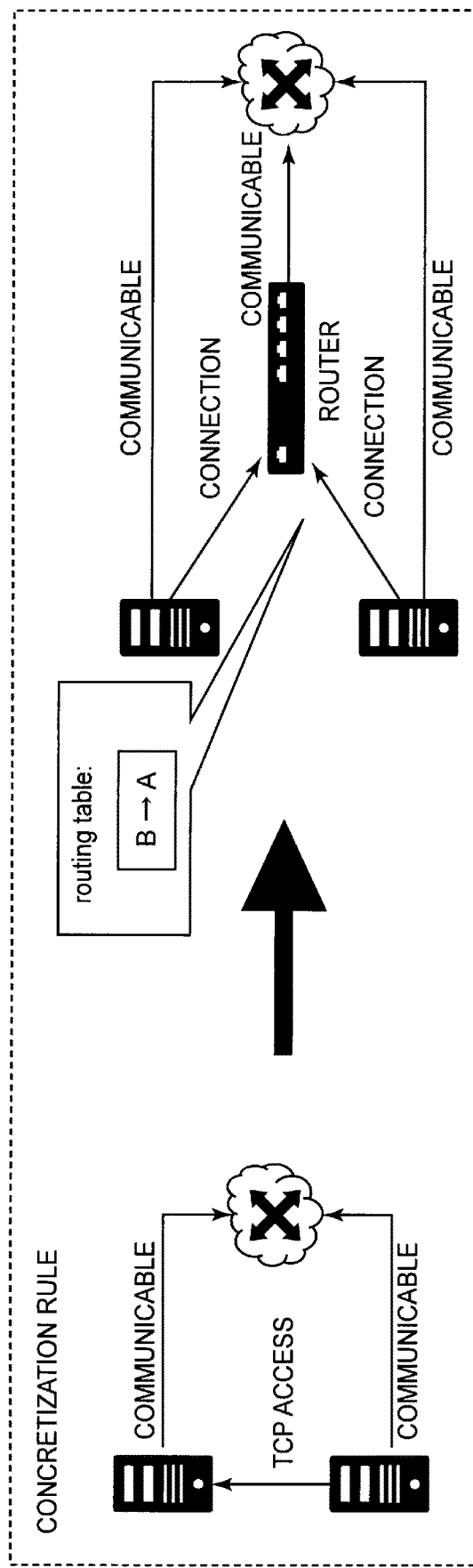
FIG. 7 is an explanatory diagram showing another example of the concretization rule for concretizing the "TCP access" requirement.
Figure 8:
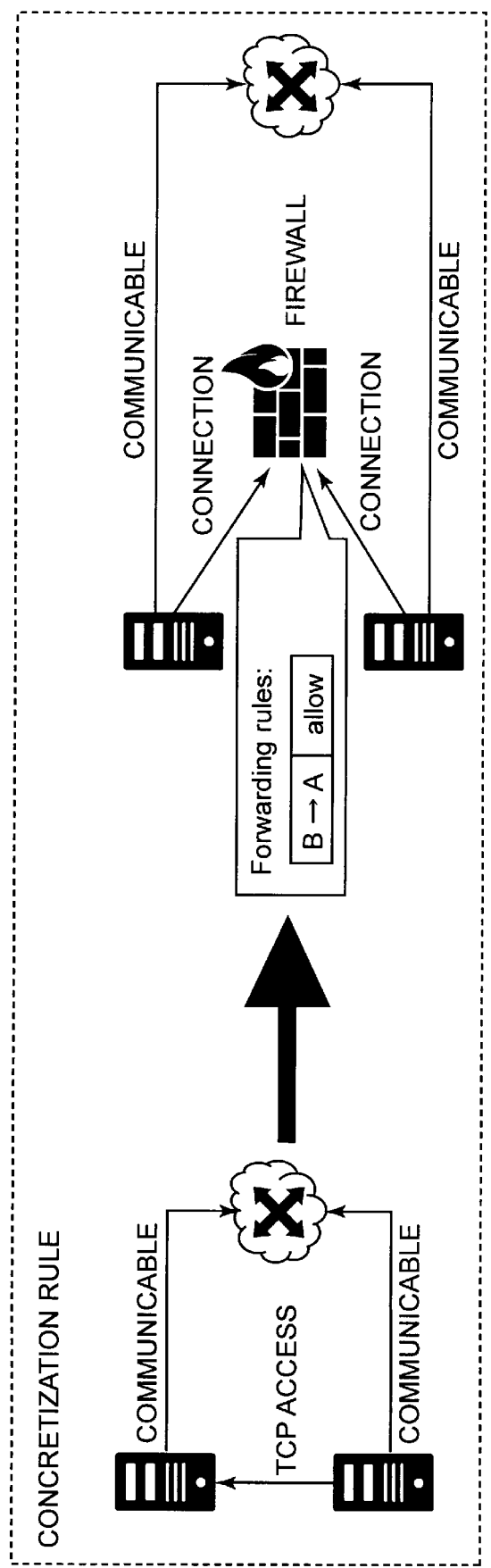
FIG. 8 is an explanatory diagram showing another example of the concretization rule for concretizing the "TCP access" requirement.
Figure 9:
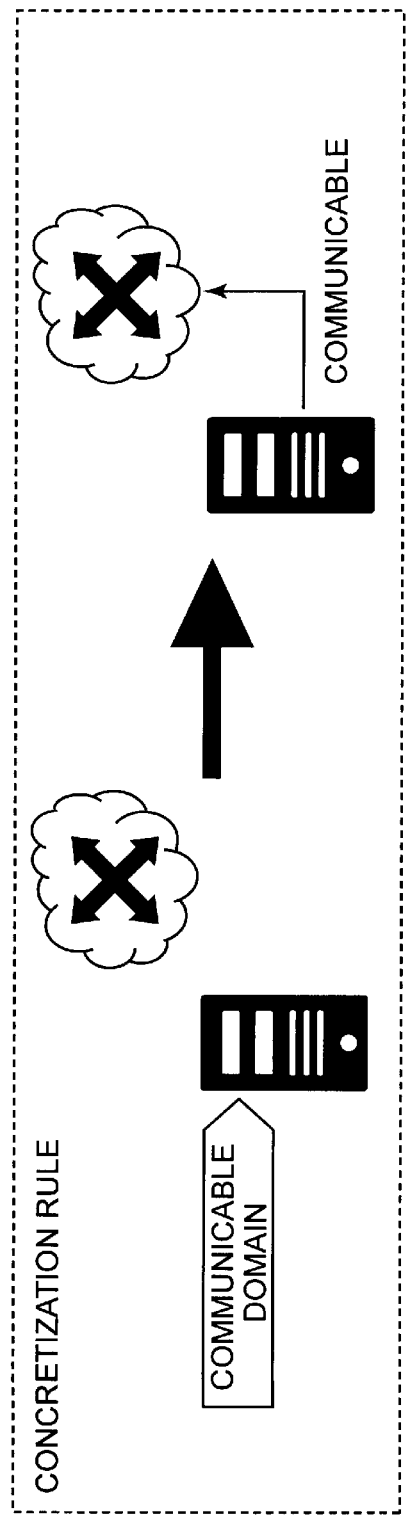
FIG. 9 is an explanatory diagram showing an example of a concretization rule for specifying a "communication"

FIGS. 6 to 9 show examples of concretization rules. FIGS. 6 to 8 show three types of concretization rules for concretizing the "TCP access" requirement. FIG. 9 shows a concretization rule for specifying a "communication" requirement directed from a subject requesting a communicable domain to the communicable domain.

FIG. 6 is an explanatory diagram showing an example of a concretization rule for concretizing the "TCP access" requirement. The concretization rule shown in FIG. 6 shows a concretization method for the situation in which the TCP access in the opposite direction of the direction indicated by the "TCP access" requirement is prohibited between the communicable domains due to the requirement between the communicable domains to which two constituent elements specifying the "TCP access" requirement communicate.

In accordance with the concretization rule shown in FIG. 6, the two constituent elements that communicate to the respective communicable domain are connected to the firewall. In addition, a forwarding rule that allows access in the forward direction ("B->A" shown in FIG. 6) and prohibits access in the reverse direction ("A->B" shown in FIG. 6) is set to the firewall.

FIG. 7 is an explanatory diagram showing another example of the concretization rule for concretizing the "TCP access" requirement. The concretization rule shown in FIG. 7 is a concretization method for the situation in which two constituent elements specifying the "TCP access" requirement communicate to the same communicable domain.

In accordance with the concretization rule shown in FIG. 7, the two constituent elements that communicate to the communicable domain are connected to the router. In addition, a routing table for performing a forward access ("B->A" shown in FIG. 7) is set to the router.

FIG. 8 is an explanatory diagram showing another example of the concretization rule for concretizing the "TCP access" requirement. The concretization rule shown in FIG. 8 is also a concretization method for the situation in which two constituent elements specifying the "TCP access" requirement communicate to the same communicable domain.

In accordance with the concretization rules shown in FIG. 8, the two constituent elements that communicate to the communicable domain are connected to the firewall. In addition, a forwarding rule that allows access in the forward direction ("B->A" shown in FIG. 8) is set to the firewall.

FIG. 9 is an explanatory diagram showing an example of a concretization rule for specifying a "communication" requirement directed from a subject requesting a communicable domain to the communicable domain. The concretization rule shown in FIG. 9 is a concretization rule for connecting an existing communicable domain to a constituent element that requests the communicable domain as a component.

In accordance with the concretization rule shown in FIG. 9, a "communication" requirement is specified from the labeled constituent element to the communicable domain, and the label requesting the communicable domain attached to the constituent element is deleted.

Referring to the concretization rules shown in FIGS. 6 to 8, when the "TCP access" requirement is concretized, the concretization rule to be used for concretizing is different according to the configuration of the communicable domain specified by the "communication" requirement from the constituent elements at both ends.

For example, the respective "communication" requirements from the servers 32 and 33 at both ends of the "TCP access" requirement 36 shown in FIG. 5 specify the communicable domain 30. Thus, the "TCP access" requirement 36 is concretized in accordance with the concretization rule shown in FIG. 7 or 8.

Furthermore, the respective "communication" requirements from the servers 33 and 34 at both ends of the "TCP access" requirement 37 shown in FIG. 5 specify the communicable domain 30 and the communicable domain 31, respectively. In addition, as shown in FIG. 5, the "access disapproval" requirement is specified from the communicable domain 30 to the communicable domain 31. Thus, the "TCP access" requirement 37 is concretized in accordance with the concretization rule shown in FIG. 6.

As shown in FIG. 5, no "communication" requirement is specified from the server 35 to any communicable domain. Thus, in accordance with the concretization rule shown in FIG. 9, unless a "communication" requirement is specified from the server 35 to any communicable domain, no concretization rule is applied to the "TCP access" requirement 38 shown in FIG. 5.

The configuration information concretization unit 110 uses the input abstract configuration as the initial draft of system configuration information and gradually concretizes the initial draft using the concretization rules as shown in FIGS. 6 to 9. The process for concretizing the abstract configuration by the configuration information concretization unit 110 is represented by, for example, a search tree.

FIG. 10 is an explanatory diagram showing an example of a search tree representing a process for concretizing an abstract configuration by the configuration information concretization unit 110. The rounded rectangles shown in FIG. 10 represent drafts of system configuration information. The draft in the present exemplary embodiment is configuration information including an abstract element. Hereinafter, an abstract element is also referred to as an abstract constituent element.

The configuration information concretization unit 110 rewrites a draft in accordance with the concretization rule to repeatedly generate a plurality of drafts derived from the rewriting source draft. The generated drafts are recorded as child elements of the rewriting source draft in the search tree.

For simplification of notation, elements included in the drafts in FIG. 10 are omitted. FIGS. 11 and 12 show search trees in which the elements included in the drafts are not omitted. FIG. 11 is an explanatory diagram showing a part of the search tree shown in FIG. 10. FIG. 11 shows the left part of the search tree shown in FIG. 10.

FIG. 12 is an explanatory diagram showing another part of the search tree shown in FIG. 10. FIG. 12 shows the center part and the right part of the search tree shown in FIG. 10.

For simplification of notation, in the drafts shown in FIGS. 11 and 12, each "TCP access" requirement is represented as an arrow, each "communication" requirement is represented as a dotted arrow, each "access disapproval" requirement is represented as a double-lined arrow, and each request for a communicable domain is represented as a white label.

At each branch in the search trees shown in FIGS. 11 and 12, the configuration information concretization unit 110 applies all applicable concretization rules to all the abstract constituent elements and abstract requirements included in each branch source draft.

For example, a draft 45 shown in FIG. 12 includes two "TCP access" requirements. When a "TCP access" requirement 45-1 is concretized in accordance with the concretization rule shown in FIG. 7, a draft 46 is generated. When the "TCP access" requirement 45-1 is concretized in accordance with the concretization rule shown in FIG. 8, a draft 47 is generated. When a "TCP access" requirement 45-2 is concretized in accordance with the concretization rule shown in FIG. 6, a draft 48 is generated.

At the end of the search tree shown in FIG. 11, there are four types of a draft 41, a draft 42, a draft 43, and a draft 44. The drafts 41 to 44 cannot be further concretized.

The drafts 42, 43, and 44 shown in FIG. 11 are drafts in which all the components and requirements are concretized. That is, the drafts 42, 43, and 44 correspond to concrete system configuration information whose generation source is the draft 40, which is an abstract configuration. The draft 41 shown in FIG. 11 is a draft having no derived drafts and not concretized yet.

[Description of Operation]

In the following, the operation of the system configuration derivation device 100 in the present exemplary embodiment for deriving a system configuration will be described with reference to FIG. 13. FIG. 13 is a flowchart showing the operation in a system configuration derivation process of the system configuration derivation device 100 in the first exemplary embodiment.

First, the configuration information concretization unit 110 receives an input of a configuration requirement described as an abstract configuration from the input/output device (step S101).

Then, the configuration information concretization unit 110 generates a search tree whose root is the received configuration requirement (step S102). The configuration information concretization unit 110 records the generated search tree.

Then, the configuration information concretization unit 110 confirms whether the search of all the drafts in the search tree is completed (step S103). When the search is completed (Yes in step S103), the system configuration derivation device 100 terminates the entire system configuration derivation process.

When the search of all the drafts in the search tree is not completed (No in step S103), the configuration information concretization unit 110 selects one draft to be searched next (step S104). As a method of selecting the draft to be searched next, the configuration information concretization unit 110 can use a method, such as random selection, depth priority selection, or width priority selection.

Then, the configuration information concretization unit 110 confirms whether the concretization trial of all the abstract constituent elements included in the selected draft is completed (step S105). If the concretization trial is completed (Yes in step S105), the configuration information concretization unit 110 performs the process of step S103 again.

When the concretization trial of all the abstract constituent elements is not completed (No in step S105), the configuration information concretization unit 110 selects an abstract constituent element to be concretized from among the abstract constituent elements whose trial is not completed (step S106). As a method of selecting the abstract constituent element to be concretized, the configuration information concretization unit 110 can use a method, such as random selection, depth priority selection, or width priority selection.

Then, the configuration information concretization unit 110 inquires of the concretization rule recording unit 120 about the concretization rule that can be used for rewriting, using the selected abstract constituent element to be concretized as a key. Then, the configuration information concretization unit 110 acquires the concretization rule from the concretization rule recording unit 120 (step S107).

Then, the configuration information concretization unit 110 confirms whether the all the options of the concretization methods described in the acquired concretization rule have been tried (step S108). When all the options have been tried (Yes in step S108), the configuration information concretization unit 110 performs the process of step S103 again.

When all the options of the concretization methods have not been tried (No in step S108), the configuration information concretization unit 110 selects an option indicating the concretization method to be applied from the unselected options. As a method of selecting the concretization method, the configuration information concretization unit 110 can use a method, such as random selection, depth priority selection, or width priority selection.

Then, the configuration information concretization unit 110 rewrites a part of the configuration including the abstract constituent element selected in accordance with the rewriting rule indicated by the selected concretization method to generate a new draft obtained by converting the draft selected in step S104.

Then, the configuration information concretization unit 110 adds the generated new draft to the search tree as a child element of the draft selected in step S104. By executing the above process, the configuration information concretization unit 110 updates the search tree (step S109).

The configuration information concretization unit 110 further records, as additional information about the draft selected in step S104, that the concretization method selected in step S109 has been applied to the abstract constituent element selected in step S106.

The configuration information concretization unit 110 further records, when all the concretization methods have been applied to the abstract constituent element selected in step S106, that all the options have been tried for the abstract constituent element as additional information about the draft.

The configuration information concretization unit 110 further records, when recording that all the options have been tried for all the abstract constituent elements of the draft selected in step S104, that concretization of all the abstract constituent elements has been tried as additional information about the draft. In the determination process in each of steps S103, S105, and S108, the configuration information concretization unit 110 can use the recorded additional information about the draft.

Then, the configuration information concretization unit 110 confirms whether all the constituent elements in the new draft generated by rewriting are concrete (step S110). When a non-concrete constituent element is included (No in step S110), the configuration information concretization unit 110 performs the process of step S103 again.

If all the constituent elements are concrete (Yes in step S110), the configuration information concretization unit 110 transmits the new draft generated in step S109 to the input/output device as concrete system configuration information (step S111).

The input/output device receiving the system configuration information outputs the system configuration information to the user. After the transmission, the configuration information concretization unit 110 performs the process of step S103 again.

[Description of Effects]

The system configuration derivation device 100 in the present exemplary embodiment is a system configuration derivation device that automatically derives a system configuration. The system configuration derivation device 100 includes the configuration information concretization unit 110 that receives an input of abstract configuration information in which the system configuration is abstractly represented as a configuration requirement of a system and converts the abstract configuration information into concrete system configuration information. The system configuration derivation device 100 also includes the concretization rule recording unit 120 that records a concretization rule defining a method for concretizing the abstract configuration information.

The configuration information concretization unit 110 repetitively converts a part or all of the configuration requirement in accordance with the concretization rule to gradually concretize the configuration requirement. The configuration information concretization unit 110 repeats further concretizing the concretized configuration requirement only when the requirement or constraint condition included in each component or the relationship between components is satisfied in the concretized configuration requirement. With the above configuration, the system configuration derivation device 100 in the present exemplary embodiment can generate concrete system configuration information.

The system configuration derivation device 100 in the present exemplary embodiment handles a process for converting the input configuration requirement into concrete system configuration information as a graph rewriting problem. When solving the graph rewriting problem, the system configuration derivation device 100 reuses the information about the constituent elements that are the past development assets and the information about the concretization rule and can efficiently design the configuration of the ICT system.

Furthermore, the system configuration derivation device 100 in the present exemplary embodiment can expand the types of derivable configurations by adding an abstract component, the abstract relationship between components, and a rewriting rule. That is, since there is no particular constraint on the derivable design configuration, the system configuration derivation device 100 can flexibly handle a plurality of requirements required for operation.

Furthermore, the system configuration derivation device 100 in the present exemplary embodiment suspends the application of the rewriting rule when a draft does not satisfy the condition in the process for gradually concretizing the abstract configuration requirement. That is, since the search tree is pruned, the system configuration derivation device 100 can design the configuration of the ICT system at higher speed.

Second Exemplary Embodiment

[Description of Configuration]

Next, a second exemplary embodiment of the present invention will be described with reference to the drawings. FIG. 14 is a block diagram showing a configuration example of a system configuration derivation device 101 in the second exemplary embodiment.

The system configuration derivation device 101 shown in FIG. 14 is different from the system configuration derivation device 100 shown in FIG. 1 and includes a concretization policy determination unit 130. As shown in FIG. 14, the concretization policy determination unit 130 is communicably connected to a concretization rule recording unit 120.

As shown in FIG. 14, a configuration information concretization unit 110 is communicably connected to an input/output device and the concretization policy determination unit 130. The configuration of the system configuration derivation device 101 other than the concretization policy determination unit 130 is similar to the configuration of the system configuration derivation device 100.

The concretization policy determination unit 130 has a function of selecting a draft to be concretized, an abstract constituent element, and a concretization rule to be applied. In the following, the operation of the concretization policy determination unit 130 in the present exemplary embodiment will be described.

The concretization policy determination unit 130 operates in response to an inquiry from the configuration information concretization unit 110. After receiving the inquiry, the concretization policy determination unit 130 generates one or more sets (d, a, m) representing an applicable concretization method m for an abstract constituent element a that is not concretized yet in a draft d of the search tree.

After generating the sets, the concretization policy determination unit 130 returns the set determined to be most appropriate as the next set to be concretized to the configuration information concretization unit 110 as a "concretization policy". After receiving the set (d, a, m) as the concretization policy, the configuration information concretization unit 110 concretizes the abstract constituent element a in the draft d by the concretization method m to generate a new draft. The configuration information concretization unit 110 adds the generated draft to the search tree.

For example, the concretization policy determination unit 130 may operate in accordance with an algorithm of "returning a concretization policy for obtaining a configuration with a smaller abstraction degree". Specifically, the concretization policy determination unit 130 determines that the concretization policy for minimizing "the total of the number of requirements that are not concrete and the number of unsatisfied requests" included in the draft newly generated in accordance with the concretization policy is the most appropriate concretization policy. Hereinafter, the above algorithm will be referred to as a "concretization degree highest priority strategy".

FIG. 15 is an explanatory diagram showing an example of a concretization policy generated by the concretization policy determination unit 130. FIG. 15 shows that the abstraction degree in the generated draft is different depending on the abstraction requirement to be concretized. In the example shown in FIG. 15, the concretization policy determination unit 130 operates in accordance with the concretization degree highest priority strategy.

An abstract configuration 50 shown in FIG. 15 is an example of an input to the concretization policy determination unit 130. As shown in FIG. 15, the abstract configuration 50 includes two constituent elements of a Java applet and a server. The abstract configuration 50 also includes a "deployment" requirement directed from the Java applet to the server.

The concretization rule recording unit 120 records the concretization rule capable of concretizing the two abstract constituent elements of the "deployment" requirement and the "SQL Server" request included in the abstract configuration 50. FIG. 16 is an explanatory diagram showing an example of the concretization rules recorded in the concretization rule recording unit 120. FIG. 16 shows the concretization rules used for concretizing the draft in the example shown in FIG. 15.

A first rule, which is the concretization rule shown in FIG. 16, is a rule that can concretize the "deployment" requirement. A second rule, which is the concretization rule shown in FIG. 16, is a rule that can concretize the "SQL Server" request.

The concretization policy determination unit 130 computes, in accordance with the concretization degree highest priority strategy, the increase or decrease of the abstraction degree for all the applicable concretization rules. In the example shown in FIG. 15, when the first rule is applied to the abstract configuration 50, the "deployment" requirement is fulfilled, and the "Web container" request is satisfied. Thus, when the first rule is applied, the abstraction degree is reduced by two.

Alternatively, when the second rule is applied to the abstract configuration 50, the "SQL Server" request is satisfied, but a "host server" request is newly added as shown in FIG. 15. Thus, when the second rule is applied, the abstraction degree is not increased or decreased.

In consideration of the above results, the concretization policy determination unit 130 selects, in accordance with the concretization degree highest priority strategy, the set constituted by the abstract configuration 50, the "deployment" requirement, and the first rule as the concretization policy. Then, the concretization policy determination unit 130 returns the selected concretization policy to the configuration information concretization unit 110, which is the inquiry source.

The concretization policy determination unit 130 may adopt a method of "manually prioritizing the concretization methods" as the method of selecting the concretization policy. That is, as a preparation in advance, the administrator of the ICT system manually adds a score indicating the priority to each concretization method.

Then, the concretization policy determination unit 130 selects the concretization method with the highest score among the applicable concretization methods. The concretization policy determination unit 130 returns the concretization policy including the selected concretization method.

The concretization policy determination unit 130 may adopt a method of "generating an evaluation function of the concretization policy on the basis of the results of successes and failures in past concretization" as the method of selecting the concretization policy. Specifically, the concretization policy determination unit 130 feeds back the record of the past operation itself to add an evaluation value to the concretization policy.

The operation record shows, for example, the result that "the concretized system configuration is obtained when the concretization policy (the draft d to be concretized, the abstract constituent element a, the concretization method m) is adopted". In addition, the operation record shows, for example, the result that "the concretization is not completed although the drafts derived from the draft d is searched when the concretization policy (draft d to be concretized, the abstract constituent element a, and the concretization method m) is adopted".

The concretization policy determination unit 130 may add, for example, one of evaluation values of "1 (success)", "0 (no information)", and "−1 (failure)" to the concretization policy on the basis of past operation record. The concretization policy determination unit 130 may generate the evaluation function by executing supervised machine learning using the teacher data in which the concretization policy and the past result are associated with each other.

Note that, the configuration information concretization unit 110 in the present exemplary embodiment outputs, together with the system configuration information, the conversion path until the concrete system configuration information is obtained from the configuration requirement.

The conversion path until the concrete system configuration information is obtained from the configuration requirement is, for example, a draft line constituted by all the drafts $d_1, d_2, \ldots,$ and $d_{n-1}$ through which the path reaches the concrete system configuration information $d_n$ from the configuration requirement $d_0$, which is the root of the search tree, by tracking the branches of the search tree. For example, the conversion path is represented as "$d_0, d_1, d_2, \ldots, d_{n-1},$ and $d_n$".

In order to generate the conversion path, the configuration information concretization unit 110 causes, for example, each draft to hold information indicating "a parent draft or a pointer of a parent draft" and which concretization method has been used for conversion. When the information is held in each draft, the configuration information concretization unit 110 can generate a conversion path by tracking back the search tree from the concrete system configuration information to the root configuration requirement.

The concretization policy determination unit 130 in the present exemplary embodiment may be communicably connected to the input/output device. FIG. 17 is a block diagram showing another configuration example of the system configuration derivation device 101 in the second exemplary embodiment.

The concretization policy determination unit 130 in the example shown in FIG. 17 transfers the determination of a concretization policy to an external function, a user, or the like. The concretization policy determination unit 130 receives the concretization policy including the draft to be concretized, which is determined through the input/output device.

The concretization policy determination unit 130 inputs the input concretization policy to the configuration information concretization unit 110. When requesting the external function, the user, or the like to determine a concretization policy, the concretization policy determination unit 130 may present the concretization policy determined by itself for reference.

[Description of Operation]

In the following, the operation of the system configuration derivation device 101 in the present exemplary embodiment for deriving a system configuration will be described with reference to FIG. 18. FIG. 18 is a flowchart showing the operation in a system configuration derivation process of the system configuration derivation device 101 in the second exemplary embodiment.

The processes of step S201 to step S203 is similar to the processes of step S101 to step S103 shown in FIG. 13, respectively. That is, the configuration information concretization unit 110 receives an input of a configuration requirement described as an abstract configuration from the input/output device (step S201).

Then, the configuration information concretization unit 110 generates a search tree whose root is the received configuration requirement (step S202). The configuration information concretization unit 110 records the generated search tree.

Then, the configuration information concretization unit 110 confirms whether the search of all the drafts in the search tree is completed (step S203). When the search of all the drafts in the search tree is not completed (No in step S203), the configuration information concretization unit 110 inquires of the concretization policy determination unit 130 about a concretization policy (step S204).

Then, the concretization policy determination unit 130 returns a concretization policy including a draft to be concretized, an abstract constituent element in the draft, and a concretization method to the configuration information concretization unit 110.

When receiving the inquiry about the concretization policy from the configuration information concretization unit 110, the concretization policy determination unit 130 shown in FIG. 17 transmits information indicating the current search tree to the input/output device. When receiving an input of the abstract constituent element in the draft to be concretized from the input/output device, the concretization policy determination unit 130 acquires the concretization rule applicable to the input abstract constituent element from the concretization rule recording unit 120.

Then, the concretization policy determination unit 130 shown in FIG. 17 transmits the acquired concretization rule to the input/output device again. When receiving the input of the concretization policy from the input/output device, the concretization policy determination unit 130 returns the concretization policy including the abstract constituent element in the received draft to the configuration information concretization unit 110.

Then, the configuration information concretization unit 110 generates a new draft in which the configuration of the draft to be concretized is rewritten in accordance with the received concretization policy. Then, the configuration information concretization unit 110 adds the generated new draft to the search tree as a child element of the draft to be concretized.

By executing the above process, the configuration information concretization unit 110 updates the search tree (step S205). After updating the search tree, the configuration information concretization unit 110 performs the process of step S203 again.

When the search of all the drafts in the search tree is completed (Yes in step S203), the configuration information concretization unit 110 sets the draft in which all the constituent elements are concrete as the concrete system configuration information.

In addition, the configuration information concretization unit 110 attaches the information regarding the conversion path until the concrete system configuration information is obtained from the input configuration requirement to the system configuration information. Then, the configuration information concretization unit 110 transmits the generated information to the input/output device (step S206).

The input/output device receiving the system configuration information and the like outputs the received information to the user. After the transmission, the system configuration derivation device 101 terminates the entire system configuration derivation process.

[Description of Effects]

The configuration information concretization unit 110 of the system configuration derivation device 101 in the present exemplary embodiment receives the input abstract configuration as a configuration requirement and inputs the configuration requirement to the concretization policy determination unit 130. The configuration information concretization unit 110 receives the concretization policy including the part to be concretized from the concretization policy determination unit 130 and repetitively rewrites the abstract configuration on the basis of the concretization policy to generate and output completely concretized system configuration information.

When receiving the abstract configuration from the configuration information concretization unit 110, the concretization policy determination unit 130 determines the next part to be concretized and acquires the concretization method options of the determined part to be concretized from the concretization rule recording unit 120. Then, the concretization policy determination unit 130 determines the concretization method from the acquired options and inputs the determined part to be concretized and concretization method to the configuration information concretization unit 110.

The system configuration derivation device 101 in the present exemplary embodiment includes the concretization policy determination unit 130 that determines the policy regarding the conversion of the configuration information as described above. The concretization policy determination unit 130 determines the part of the abstract configuration to be converted in each conversion operation and selects one conversion method option described in the conversion rule applicable to the determined part. The configuration information concretization unit 110 in the present exemplary embodiment converts the abstract constituent element in accordance with the determination of the concretization policy determination unit 130.

The configuration information concretization unit 110 in the present exemplary embodiment preferentially tries a rewriting rule satisfying the conditions specified by the concretization policy determination unit 130 and having a higher possibility of implementing a concrete system configuration in the process for gradually concretizing the abstract configuration requirement.

Thus, the system configuration derivation device 101 in the present exemplary embodiment does not need to perform a large number of searches and thus can design the system configuration faster than the system configuration derivation device 100 in the first exemplary embodiment. That is, the system configuration derivation device 101 can derive a system configuration that satisfies a plurality of requirements more quickly.

In addition, the user receives the information indicating the process for concretization and the information indicating the grounds for selection of the concretization policy and thus can easily adjust input requirements for designing a more accurate system configuration using the system configuration derivation device 101.

Furthermore, when the system configuration derivation device 101 shown in FIG. 17 is used, the system designer can be involved in the decision making regarding the concretization of the system design. That is, the system configuration derivation device 101 shown in FIG. 17 can design a system configuration more conforming to the designer's intention.

Third Exemplary Embodiment

[Description of Configuration]

Next, a third exemplary embodiment of the present invention will be described with reference to the drawings. FIG. 19 is a block diagram showing a configuration example of a system configuration derivation device 102 in the third exemplary embodiment.

The system configuration derivation device 102 shown in FIG. 19 is different from the system configuration derivation device 101 shown in FIG. 14 and includes a requirement combining unit 140. As shown in FIG. 19, the requirement combining unit 140 is communicably connected to an input/output device and a configuration information concretization unit 110. The configuration of the system configuration derivation device 102 other than the requirement combining unit 140 is similar to the configuration of the system configuration derivation device 101.

The requirement combining unit 140 has a function of combining configuration requirements in a divided state, which are individually input by a plurality of users, into a single abstract configuration. In the following, the operation of the requirement combining unit 140 in the present exemplary embodiment will be described.

FIG. 20 is an explanatory diagram showing an example of a fragmentary configuration requirement input to the requirement combining unit 140. The configuration requirement shown in FIG. 20 includes a constituent element 61 representing the Internet, a constituent element 62 representing a web page, and a "browsing" requirement from the constituent element 61 toward the constituent element 62.

FIG. 21 is an explanatory diagram showing another example of the fragmentary configuration requirement input to the requirement combining unit 140. The configuration requirement shown in FIG. 21 includes a constituent element 63 representing the Internet, a constituent element 64 representing a mail server, and a constituent element 65 representing a user terminal.

The configuration requirement shown in FIG. 21 includes the "Simple Mail Transfer Protocol (SMTP) connection" requirement from the constituent element 63 toward the constituent element 64 and the "Post Office Protocol (POP) 3 connection" requirement from the constituent element 65 toward the constituent element 64.

FIG. 22 is an explanatory diagram showing another example of the fragmentary configuration requirement input to the requirement combining unit 140. The configuration requirement shown in FIG. 22 includes a constituent element 66 representing the Internet, a constituent element 67 representing a user terminal, a constituent element 68 representing a DeMilitarized Zone (DMZ), and a constituent element 69 representing an intranet.

The configuration requirement shown in FIG. 22 includes a "communication" requirement from the constituent element 66 toward the constituent element 68, a "communication" requirement from the constituent element 67 toward the constituent element 69, and an "access disapproval" requirement from the constituent element 68 toward the constituent element 69. The constituent requirements shown in FIGS. 20 to 22 are examples of fragmentary configuration requirements that are individually input by a plurality of users.

FIG. 23 is an explanatory diagram showing an example of a single configuration requirement output by the requirement combining unit 140. The single configuration requirement shown in FIG. 23 represents an abstract configuration generated by the requirement combining unit 140 combining all the three fragmentary configuration requirements shown in FIGS. 20 to 22.

The constituent element 61 shown in FIG. 20, the constituent element 63 shown in FIG. 21, and the constituent element 66 shown in FIG. 22 all represent the Internet. Thus, the requirement combining unit 140 combines the three constituent elements into one constituent element 71. The constituent element 71 becomes a constituent element of the configuration requirement shown in FIG. 23.

The constituent element 65 shown in FIG. 21 and the constituent element 67 shown in FIG. 22 both represent the user terminal. Thus, the requirement combining unit 140 combines the two constituent elements into one constituent element 72. The constituent element 72 becomes a constituent element of the configuration requirement shown in FIG. 23.

The requirement combining unit 140 directly sets the constituent elements shown in FIGS. 20 to 22 other than the combined constituent elements as the constituent element of the configuration requirement shown in FIG. 23.

Thus, the configuration requirement shown in FIG. 23 is constituted by the six constituent elements representing the Internet, the web page, the mail server, the user terminal, the DMZ, and the intranet and the six requirements specified between the constituent elements in accordance with the configuration requirements shown in FIGS. 20 to 22.

[Description of Operation]

In the following, the operation of the system configuration derivation device 102 in the present exemplary embodiment for deriving a system configuration will be described with reference to FIG. 24. FIG. 24 is a flowchart showing the operation in a system configuration derivation process of the system configuration derivation device 102 in the third exemplary embodiment.

In the system configuration derivation device 102 in the present exemplary embodiment, before the configuration information concretization unit 110 receives a configuration requirement, the requirement combining unit 140 receives and converts an input from a user and then inputs it to the configuration information concretization unit 110.

First, the requirement combining unit 140 receives an input of configuration requirements from a plurality of users via the input/output device (step S301).

Then, the requirement combining unit 140 combines the received configuration requirements to generate a single configuration requirement (step S302).

Then, the requirement combining unit 140 inputs the configuration requirement obtained in step S302 to the configuration information concretization unit 110 (step S303).

The processes of step S304 to step S308 are similar to the processes of step S202 to step S206 shown in FIG. 18, respectively. That is, the operation of the configuration information concretization unit 110 for receiving, concretizing, and inputting the configuration requirement to the input/output device is similar to the operation in the second exemplary embodiment.

[Description of Effects]

In the present exemplary embodiment, the requirement combining unit 140 combines the configuration requirements individually input from a plurality of users into a single abstract configuration, and the system configuration derivation device 102 can construct and update the system while maintaining the consistency between all the given requirements.

That is, when the system configuration derivation device 102 is used, a plurality of users involved in system management does not have to grasp the entire system. The users are only required to manage the requirements for the partial configurations that the respective users manage.

Fourth Exemplary Embodiment

[Description of Configuration]

Next, a fourth exemplary embodiment of the present invention will be described with reference to the drawings. FIG. 25 is a block diagram showing a configuration example of a system configuration derivation device 103 in the fourth exemplary embodiment.

The system configuration derivation device 103 shown in FIG. 25 is different from the system configuration derivation device 101 shown in FIG. 14 and includes a configuration information conversion unit 150. As shown in FIG. 25, the configuration information conversion unit 150 is communicably connected to a configuration information concretization unit 110 and a deployment device 200 outside the system configuration derivation device 103. The configuration of the system configuration derivation device 103 other than the configuration information conversion unit 150 is similar to the configuration of the system configuration derivation device 101.

The configuration information conversion unit 150 in the present exemplary embodiment has a function of converting concrete system configuration information generated by the configuration information concretization unit 110 into system configuration information described in a specification that can be received by the external deployment device 200.

The external deployment device 200 has a function of deploying, when receiving the concrete system configuration information, the system in accordance with the content described in the system configuration information. The description method of the concrete system configuration information that can be received by the external deployment device 200 is, for example, an OASIS (registered trademark)/Topology and Orchestration Specification for Cloud Applications (TOSCA) specification, which is the international standard specification for describing the configuration of a system that operates in a cloud computing platform.

The external deployment device 200 is, for example, an orchestrator having a function of deploying the system on the basis of the system configuration information described in the TOSCA specification.

In the following, the TopologyTemplate specification in the OASIS/TOSCA specification is described. The TopologyTemplate is a specification for describing the system configuration using a combination of a plurality of components.

The elements described in the TopologyTemplate include Node, which is an element representing a component, and Relation, which represents the relationship between components. When the TopologyTemplate is used, the system configuration is represented in a graph in which Nodes are connected by Relations.

In addition, information indicating the type is attached to each Node and each Relation. In the information indicating the type, a general property, an attribute, the type of Relation that can be defined with other Nodes, and the like are defined.

The concrete system configuration information generated by the configuration information concretization unit 110 in the present exemplary embodiment can also be represented in a graph. Thus, by defining the mapping information between each constituent element or each relationship and the corresponding TOSCA Node type or Relation type, the configuration information conversion unit 150 can convert, on the basis of the defined mapping information, the system configuration information into TOSCA TopologyTemplate format information.

However, the content of the mapping information may not be necessarily limited to the content in which a constituent element corresponds to Node and a relationship corresponds to Relation. For example, in the mapping information, a correspondence relationship such that a set of a constituent element and a relationship is converted into Relation or a relationship is converted into a set of Node and Relation may be defined.

For example, the case in which a relationship r connects a constituent element a and a constituent element b is described. When the constituent element a corresponds to Node 1 and the constituent element b corresponds to Node 2, the relationship r may be converted into Relation 3 connecting Node 1 and Node 2.

Alternatively, the relationship r may be converted into Node 3 and two Relations. The two Relations are Relation connecting Node 3 and Node 1 and Relation connecting Node 3 and Node 2.

[Description of Operation]

In the following, the operation of the system configuration derivation device 103 in the present exemplary embodiment for deriving a system configuration will be described with reference to FIG. 26. FIG. 26 is a flowchart showing the operation in a system configuration derivation process of the system configuration derivation device 103 in the fourth exemplary embodiment.

The processes of step S401 to step S406 are similar to the processes of step S201 to step S206 shown in FIG. 18, respectively. That is, the operation until the configuration information concretization unit 110 generates concrete system configuration information is similar to the operation in the second exemplary embodiment.

After transmitting the generated information to the input/output device, the configuration information concretization unit 110 inputs the generated concrete system configuration information to the configuration information conversion unit 150 (step S407).

Then, the configuration information conversion unit 150 converts, in accordance with a predetermined conversion method, such as the TOSCA specification, the input concrete system configuration information into system configuration information for deployment.

Then, the configuration information conversion unit 150 transmits the converted system configuration information for deployment to the external deployment device 200 (step S408). After the transmission, the system configuration derivation device 103 terminates the entire system configuration derivation process.

The external deployment device 200 constructs a system on the basis of the received system configuration information, and thereby a system designed on the basis of the user's configuration requirements is deployed.

Note that, before inputting the generated concrete system configuration information to the configuration information conversion unit 150, the configuration information concretization unit 110 may present the generated concrete system configuration information to the user via the input/output device. When presenting, the configuration information concretization unit 110 may confirm whether the user allows the system indicated by the system configuration information to be deployed.

[Description of Effects]

The configuration information conversion unit 150 in the present exemplary embodiment can convert the system configuration information generated by the configuration information concretization unit 110 into system configuration information described in a specification that can be received by the external deployment device 200. Thus, when the system configuration derivation device 103 in the present exemplary embodiment is used, the user can automate a series of operations until the system configuration is concretized to deploy the system only by inputting the configuration requirement.

Fifth Exemplary Embodiment

[Description of Configuration] Next, a fifth exemplary embodiment of the present invention will be described with reference to the drawings. FIG. 27 is a block diagram showing a configuration example of a system configuration derivation device 104 in the fifth exemplary embodiment.

The system configuration derivation device 104 shown in FIG. 27 is different from the system configuration derivation device 103 shown in FIG. 25 and includes a configuration requirement recording unit 160 and a requirement confirmation unit 170. As shown in FIG. 27, the configuration requirement recording unit 160 is communicably connected to an input/output device, a configuration information concretization unit 110, and the requirement confirmation unit 170.

As shown in FIG. 27, the requirement confirmation unit 170 is communicatively connected to the configuration information concretization unit 110, a configuration information conversion unit 150, a monitoring device 300 outside the system configuration derivation device 104, and a state management device 400 outside the system configuration derivation device 104. The configuration of the system configuration derivation device 104 other than the configuration requirement recording unit 160 and the requirement confirmation unit 170 is similar to the configuration of the system configuration derivation device 103.

The external monitoring device 300 has a function of monitoring the state of a monitoring target system. When there is a change in the state, the monitoring device 300 notifies the state management device 400 and the like of the state of the monitoring target system.

For example, when a failure occurs in a part of the monitoring target system and a predetermined connection is interrupted, the monitoring device 300 detects a change in the state of the predetermined connection and notifies the state management device 400 of the state regarding the predetermined connection as a failure state.

The external state management device 400 has a function of readably recording the state of the monitoring target system. The state management device 400 records the state of each component of the monitoring target system, assuming that the monitoring target system is configured by combining a plurality of components.

For example, when a part of the connection is interrupted as described above, the state management device 400 readably records the state of the connection as a failure state.

The configuration requirement recording unit 160 in the present exemplary embodiment has a function of readably recording an input configuration requirement.

The requirement confirmation unit 170 in the present exemplary embodiment has a function of determining whether the system configuration satisfies the condition described in the configuration requirement. When determining that the requirement is not satisfied, the requirement confirmation unit 170 notifies the configuration information concretization unit 110 of an update request.

By notifying of the update request, the requirement confirmation unit 170 causes the configuration information concretization unit 110 to redesign the configuration of the monitoring target system to restore the monitoring target system to a state in which the requirement is satisfied.

For example, when a configuration requirement describing the configuration of a web application is newly input, the state management device 400 cannot acquire the corresponding current configuration. Thus, the requirement confirmation unit 170 determines that the configuration requirement is not satisfied.

Then, the requirement confirmation unit 170 notifies the configuration information concretization unit 110 of the update request. The configuration information concretization unit 110 generates concrete system configuration information about the web application on the basis of the configuration requirement. Then, the deployment device 200 deploys the web application on the basis of the generated system configuration information. That is, the system is not updated, but a new system is constructed.

Alternatively, when, for example, the configuration of the web application is expanded by adding resources and the overwritten configuration requirement of the web application is input, the state management device 400 can acquire the corresponding current configuration.

The acquired current configuration does not satisfy the new overwritten configuration requirement. Thus, the requirement confirmation unit 170 notifies the configuration information concretization unit 110 of the update request. Then, the deployment device 200 is notified of a new deployment request, and the deployment device 200 deploys additional resources to the web application.

In the following, an example of an implementation means of the requirement confirmation unit 170 that can be considered when a precondition that "all concretization methods do not erase components" is set will be described.

After receiving the configuration requirement and the current configuration, the requirement confirmation unit 170 performs a process similar to that performed by the configuration information concretization unit 110 to start generating a search tree. However, when the newly generated draft includes more components than the components included in the current configuration, the search tree generated using the draft as the root does not include the current configuration.

In consideration of the above facts, it is conceivable to restrict the draft to be generated in the generation of the search tree to "a draft that does not include more components than the components included in the current configuration". In addition, it is conceivable to set a restriction that "when a draft that is exactly the same as a draft that has been generated once is generated again in the search tree, the derivation of the draft is not performed".

When the above restrictions are set, the requirement confirmation unit 170 can obtain, in generating the search tree, "a group of concrete system configurations that do not include more components than the components included in the current configuration" that can be generated under the configuration requirement.

By confirming whether the current configuration is included in the group of the concrete system configurations obtained by the above method, the requirement confirmation unit 170 can determine whether the current configuration satisfies the configuration requirement.

The configuration information conversion unit 150 in the present exemplary embodiment transmits the converted concrete system configuration information to the deployment device 200 and also transmits the system configuration information and the system ID, which is a key, to the state management device 400. The state management device 400 associates the transmitted system ID and system configuration information with each other and readably records them.

[Description of Operation]

In the following, the operation of the system configuration derivation device 104 in the present exemplary embodiment for deriving a system configuration will be described with reference to FIGS. 28 and 29. The operation of the system configuration derivation device 104 in the present exemplary embodiment for deriving the system configuration includes two types of operations: an operation starting from an input of a configuration requirement via the input/output device and an operation starting from notification of the confirmation request from the monitoring device 300 to the requirement confirmation unit 170.

First, the operation starting from an input of a configuration requirement to the configuration requirement recording unit 160 will be described. FIG. 28 is a flowchart showing the operation in a system configuration derivation process of the system configuration derivation device 104 in the fifth exemplary embodiment.

First, a configuration requirement is input via the input/output device. The configuration requirement recording unit 160 receives the input configuration requirement and readably records the received configuration requirement (step S501).

A system ID may be input to the configuration requirement recording unit 160 together with the configuration requirement. When the system ID is not input, the configuration requirement recording unit 160 generates a new system ID and records it in association with the input configuration requirement. When the system ID is additionally input, the configuration requirement recording unit 160 overwrites the configuration requirement associated with the additionally input system ID with the input configuration requirement.

Then, the configuration requirement recording unit 160 inputs the recorded system ID and configuration requirement to the requirement confirmation unit 170 (step S502).

Then, the requirement confirmation unit 170 transmits the input system ID to the state management device 400. The state management device 400 acquires the current configuration of a monitoring target system using the transmitted system ID as a key (step S503).

The state management device 400 transmits the acquired current configuration of the monitoring target system to the configuration information conversion unit 150. The configuration information conversion unit 150 converts the transmitted current configuration of the monitoring target system into a format of system configuration information. Then, the configuration information conversion unit 150 inputs the converted system configuration information to the requirement confirmation unit 170.

Then, the requirement confirmation unit 170 refers to the received configuration requirements and the current configuration and confirms whether the current configuration satisfies the configuration requirement (step S504). When the current configuration satisfies the configuration requirement (Yes in step S504), the system configuration derivation device 104 terminates the entire system configuration derivation process.

When the current configuration does not satisfy the configuration requirement (No in step S504), the requirement confirmation unit 170 notifies the configuration information concretization unit 110 of an update request (step S505).

The processes of step S506 to step S513 are similar to the processes of step S401 to step S408 shown in FIG. 26, respectively. That is, the operation from when the configuration information concretization unit 110 is notified of the update request until when the concrete system configuration information is transmitted to the deployment device 200 to deploy the system is similar to the operation in the fourth exemplary embodiment.

Then, the operation starting from the confirmation request notified from the monitoring device 300 to the requirement confirmation unit 170 will be described. FIG. 29 is a flowchart showing another operation in the system configuration derivation process of the system configuration derivation device 104 in the fifth exemplary embodiment.

When detecting a change in the state of the monitoring target system, the monitoring device 300 updates the state of the monitoring target system firstly recorded in the state management device 400 to the detected new state. Then, the monitoring device 300 notifies the requirement confirmation unit 170 of the confirmation request together with the system ID of the monitoring target system.

The requirement confirmation unit 170 receives the notified system ID and confirmation request (step S601). Then, the requirement confirmation unit 170 acquires the current configuration from the state management device 400 using the received system ID as a key.

Specifically, the requirement confirmation unit 170 transmits the system ID, which is the key, to the state management device 400. The state management device 400 acquires the current configuration of the monitoring target system using the transmitted system ID as a key.

Then, the state management device 400 transmits the acquired current configuration of the monitoring target system to the configuration information conversion unit 150. The configuration information conversion unit 150 converts the transmitted current configuration of the monitoring target system into a format of system configuration information. Then, the configuration information conversion unit 150 inputs the converted system configuration information to the requirement confirmation unit 170.

The requirement confirmation unit 170 acquires the configuration requirement from the configuration requirement recording unit 160 using the received system ID as a key (step S602).

Then, the requirement confirmation unit 170 refers to the acquired configuration requirement and the current configuration and confirms whether the current configuration satisfies the configuration requirement (step S603). When the current configuration satisfies the configuration requirement (Yes in step S603), the system configuration derivation device 104 terminates the entire system configuration derivation process.

When the current configuration does not satisfy the configuration requirement (No in step S603), the requirement confirmation unit 170 inputs the configuration requirement to the configuration information concretization unit 110. The processes of step S604 to step S611 are similar to the processes of step S401 to step S408 shown in FIG. 26, respectively.

[Description of Effects]

When the system configuration derivation device 104 in the present exemplary embodiment is used, the user can perform the work for maintaining the monitoring target system from a change caused by external factors, such as a failure and the like, and update work accompanying a change in a requirement, such as function expansion or the like, only by inputting or updating the configuration requirement.

That is, since the system maintenance can be executed only by describing an abstract requirement, the user can efficiently perform the system maintenance work as compared with the case of inputting a concrete system configuration.

(Description of Graphical User Interface (GUI))

The input/output device in each exemplary embodiment includes, for example, a GUI. FIG. 30 is an explanatory diagram showing an example of a GUI provided in the input/output device in each exemplary embodiment.

As shown in FIG. 30, the GUI provided in the input/output device in each exemplary embodiment includes a requirement definition area that is a requirement editing screen used by a user to define a requirement and a design result confirmation area that is a design result displaying screen used to confirm a design result.

As shown in FIG. 30, the GUI provided in the input/output device in each exemplary embodiment further includes a design reason confirmation area that is a design reason displaying area to be used to confirm the process until the concrete system configuration information displayed in the design result confirmation area is derived from the configuration requirement displayed in the requirement definition area. In the design reason confirmation area, the content and reason of each determination until the system configuration information is derived.

As shown in FIG. 30, in the requirement definition area, an abstract configuration representing a configuration requirement is displayed in a graph or the like. The user can edit the configuration requirement with a mouse or the like by adding new nodes or edges, reconnecting existing displayed nodes or edges, or deleting the nodes or edges.

The requirement definition area may include a component reference area in which nodes and edges that can be used for editing the configuration requirement are arranged and displayed. The user can add a node to the configuration requirement by performing a mouse operation of dragging the node or edge displayed in the component reference area and dropping it in the requirement definition area.

In addition, the user can add an edge from a node to another node by clicking and selecting the edge displayed in the component reference area and dragging and dropping the edge from a node displayed in the requirement definition area to another node.

In the requirement definition area may further include an area for displaying a requirement, such as a resource saving constraint imposed on the entire design and the like, and an area for displaying the attribute of a node or edge selected when the node or edge in the configuration requirement is clicked and selected.

As shown in FIG. 30, in the design result confirmation area, the generated concrete system configuration information is displayed in a graph or the like. The design result confirmation area may include an area for displaying detailed information, such as an attribute value or the like of a clicked object when a displayed node or edge is clicked.

As shown in FIG. 30, in the design reason confirmation area, a list of the content of each determination corresponding to the process until the concrete system configuration information is derived from the configuration requirement is displayed. The content of each determination includes the content of conversion of the abstract configuration, that is, the abstract constituent element to be converted and the description of the converted constituent element or a constituent element group corresponding to the abstract constituent element.

The content of each determination may further include the score of each option used for selecting the concretization policy as a basis for the selection.

In the design reason confirmation area, selectable buttons corresponding to drafts at each point may be arranged above and below each determination. When a button is selected by clicking or the like, the content of the draft corresponding to the clicked button may be displayed in the design result confirmation area or the like. When the content of the draft is displayed, the user can recognize how the design is being gradually concretized.

In addition, the GUI may be configured to take a part of configuration generated in a process for concretization as a configuration requirement by the user selecting a requirement in the displayed draft, and dragging and dropping it in the requirement definition area.

The GUI may be configured to display, when the user selects a component or relationship displayed in the design result confirmation area by clicking or the like, each determination, displayed in the design reason confirmation area, in which the conversion affecting the selected element is executed in different colors. That is, the design reason regarding the selected part is selectively displayed in the GUI.

When the GUI shown in FIG. 30 is used, the system configuration derivation device in each exemplary embodiment can handle a process for converting the input configuration requirement into concrete system configuration information as a graph rewriting problem. That is, the system configuration derivation device in each exemplary embodiment can effectively reuse past development assets in computer computation processing to efficiently design the configuration of an ICT system.

When the GUI shown in FIG. 30 is used, the derivable configuration of the ICT system is expanded by adding abstract components, relationships between components, and rewriting rules. That is, the system configuration derivation device in each exemplary embodiment can flexibly handle a plurality of required requirements with no particular constraint on the derivable configuration of the ICT system.

The input/output device in each exemplary embodiment may not include the GUI. For example, text data indicating a configuration requirement may be input to an input/output device not including the GUI. Alternatively, an input/output device not including the GUI may output text data indicating system configuration information.

The unidirectional arrows shown in the block diagrams indicate the direction in which data (information) flows. However, the possibility that data flows bidirectionally at the positions where the arrows are shown is not excluded.

In the following, a specific example of the hardware configuration of each of the system configuration derivation devices 100 to 104 in the respective exemplary embodiments will be described. FIG. 31 is an explanatory diagram showing a hardware configuration example of a system configuration derivation device to which each exemplary embodiment of the present invention is applicable.

The system configuration derivation device shown in FIG. 31 includes a central processing unit (CPU) 81, a main storage unit 82, a communication unit 83, and an auxiliary storage unit 84. The system configuration derivation device may further include an input unit 85 for the user to operate and an output unit 86 for presenting a processing result or the progress of the processing content to the user.

Each of the system configuration derivation devices 100 to 104 is implemented by software by the CPU 81 shown in FIG. 31 executing programs that provide the functions of the constituent elements.

That is, the CPU 81 loads the programs stored in the auxiliary storage unit 84 in the main storage unit 82 and executes the programs to control the operation of each of the system configuration derivation devices 100 to 104 whereby the functions are implemented by software.

The system configuration derivation device shown in FIG. 31 may include a digital signal processor (DSP) instead of the CPU 81. Alternatively, the system configuration derivation device shown in FIG. 31 may include both the CPU 81 and the DSP.

The main storage unit 82 is used as a work region of data and a temporary save region of data. The main storage unit 82 is, for example, a random access memory (RAM).

The communication unit 83 has a function of inputting and outputting data to and from peripheral devices via a wired network or a wireless network (information communication network).

The auxiliary storage unit 84 is a non-transitory tangible storage medium. The non-transitory tangible storage medium is, for example, a magnetic disk, a magneto-optical disk, a compact disk read only memory (CD-ROM), a digital versatile disk read only memory (DVD-ROM), or a semiconductor memory.

The input unit 85 has a function of inputting data and processing instructions. The input unit 85 is an input device, such as a keyboard or a mouse.

The output unit 86 has a function of outputting data. The output unit 86 is, for example, a display device, such as a liquid crystal display device, or a printing device, such as a printer.

In addition, as shown in FIG. 31, the constituent elements of the system configuration derivation device are connected to a system bus 87.

The auxiliary storage unit 84 stores, for example, programs for implementing the configuration information concretization unit 110, the concretization policy determination unit 130, the requirement combining unit 140, the configuration information conversion unit 150, and the requirement confirmation unit 170.

The main storage unit 82 is used as, for example, a storage area for the concretization rule recording unit 120 and the configuration requirement recording unit 160. The configuration information concretization unit 110, the concretization policy determination unit 130, the configuration information conversion unit 150, and the requirement confirmation unit 170 may execute a communication process via the communication unit 83.

The system configuration derivation devices 100 to 104 may be implemented by hardware. For example, the system configuration derivation device 100 may internally have a circuit including a hardware component, such as a large scale integration (LSI) or the like, for implementing the functions as shown in FIG. 1.

In addition, a part of or all of the constituent elements may be implemented by a general purpose circuitry, a dedicated circuitry, a processor, or the like, or a combination thereof. These may be constituted by a single chip (for example, the above described LSI) or by a plurality of chips connected via a bus. A part of or all of the constituent elements may be implemented by a combination of the above circuitry or the like and a program.

In the case in which a part of or all of the constituent elements are implemented by a plurality of information processing devices, circuitries, or the like, the information processing devices, circuitries, or the like may be arranged in a concentrated manner, or dispersedly. For example, the information processing devices, circuitries, or the like may be implemented as a form in which each component is connected via a communication network, such as a client-and-server system or a cloud computing system.

Next, an outline of the present invention will be described. FIG. 32 is a block diagram showing an outline of the system configuration derivation device according to the present invention. A system configuration derivation device 90 according to the present invention includes a storage unit 91 (for example, the concretization rule recording unit 120) that stores a concretization rule in which a method is specified for concretizing abstract configuration information by confirming an unconfirmed portion of the abstract configuration information, which is information indicating configuration of a system in which the unconfirmed portion is included, and a generation unit 92 (for example, the configuration information concretization unit 110) that concretizes the abstract configuration information included in configuration requirements of the system using the concretization rule stored to generate system configuration information, which is information indicating the configuration of the system in which the unconfirmed portion is not included, on the basis of the configuration requirements.

In addition, the abstract configuration information may represent a plurality of abstract or concrete components or the relationship between components. The configuration requirement may include at least one abstract component or the relationship between components.

The generation unit 92 may generate the system configuration information by repeatedly concretizing a part or all of the configuration requirement using the concretization rule.

With such a configuration, the system configuration derivation device can design the configuration of the ICT system on the basis of the abstract configuration requirement.

The concretization rule may specify a plurality of methods for concretizing, and the generation unit 92 may generate a plurality of pieces of system configuration information by applying the plurality of methods to the abstract configuration information.

The abstract configuration information may include a plurality of unconfirmed portions having different abstraction degrees (for example, components and the relationship between components), and the generation unit 92 may stop operation of concretizing the abstract configuration information included in the configuration requirements when all of the plurality of unconfirmed portions are concretized.

The abstract configuration information may include a constraint condition imposed on a system or a requirement regarding properties required for the system, and the generation unit 92 may preferentially generate system configuration information satisfying the constraint condition or the requirement.

The concretization rule may include information regarding configuration after an unconfirmed portion is concretized, and the generation unit 92 may add the information to the configuration after the unconfirmed portion is concretized.

With such a configuration, the system configuration derivation device can handle various input configuration requirements.

The concretization rule may include a rule specifying a method for concretizing the abstract configuration information by confirming only a part of an unconfirmed portion of the abstract configuration information.

With such a configuration, the system configuration derivation device can variously generate system configuration information on the basis of a smaller number of concretization rules.

The generation unit 92 may generate system configuration information using a tree whose root is the configuration requirements of a system.

The generation unit 92 may select a method for concretizing from methods that have not been applied by tracing a concretization process of the abstract configuration information represented by the tree. The generation unit 92 may select a method when there is no applicable method among the methods for concretizing.

With such a configuration, the system configuration derivation device can comprehensively generate the system configuration information.

The generation unit 92 may output an unconfirmed portion that has been concretized and an applied method for concretizing as information regarding a concretization process of the configuration requirements.

With such a configuration, the system configuration derivation device can present the user with the concretization process of the configuration requirement.

The system configuration derivation device 90 may include a determination unit (for example, the concretization policy determination unit 130) that determines a policy regarding concretization of the abstract configuration information, the determination unit may determine a part of the abstract configuration information to be concretized in determination of the policy regarding concretization and select the concretization rule to be used to concretize the determined part, and the generation unit 92 may concretize the determined part using the selected concretization rule.

The determination unit may determine a policy regarding concretization on the basis of a predetermined determination rule or a past determination history. The determination unit may determine the policy regarding concretization on the basis of both a predetermined determination rule and a past determination history.

The determination unit may determine a policy regarding concretization on the basis of an input from outside.

With such a configuration, the system configuration derivation device can generate the system configuration information more quickly.

The system configuration derivation device 90 may include a combining unit (for example, the requirement combining unit 140) that combines a plurality of pieces of divided abstract configuration information, and the generation unit 92 may concretize the plurality of pieces of abstract configuration information that is combined.

With such a configuration, the system configuration derivation device can generate the system configuration information on the basis of the configuration requirements input by a plurality of users.

The system configuration derivation device 90 may include a conversion unit (for example, the configuration information conversion unit 150) that converts a format of system configuration information, and the conversion unit may convert a format of generated system configuration information into a format that can be received by a deployment device of a system and to transmit the converted system configuration information to the deployment device.

With such a configuration, the system configuration derivation device can concretize the configuration of a system and automate a series of operations until the system is deployed.

The system configuration derivation device 90 may include a confirmation unit (for example, the requirement confirmation unit 170) that confirms whether configuration of a system satisfies the configuration requirements, the confirmation unit may confirm whether configuration of a current system deployed by the deployment device satisfies the configuration requirements and inputs an update request for the system that does not satisfy the configuration requirements to the generation unit 92, and the generation unit 92 may generate system configuration information that satisfies the configuration requirements on the basis of the input update request. The generation unit 92 may update the system by transmitting the generated system configuration information to the deployment device via the conversion unit.

The system configuration derivation device 90 may include a configuration requirement receiving unit that receives an input of a configuration requirement and a configuration requirement recording unit (for example, the configuration requirement recording unit 160) that records the input configuration requirement.

With such a configuration, the system configuration derivation device can automate system maintenance work.

The abstract configuration information and the concrete system configuration information may be represented in a graph in which components are nodes and the relationships between the components are edges, and the concretization rule may be represented in a graph of a partial abstract configuration to be concretized and a graph of the converted abstract configuration, and the concretization of the configuration requirement by the generation unit 92 may be a graph concretization process.

In addition, a part or all of the above exemplary embodiments can also be described as the following supplementary notes, but are not limited to the following.

(Supplementary note 1) A system configuration derivation device including: a storage unit configured to store a concretization rule in which a method is specified for concretizing abstract configuration information by confirming an unconfirmed portion of the abstract configuration information, which is information indicating configuration of a system in which the unconfirmed portion is included; and a generation unit configured to concretize the abstract configuration information included in configuration requirements of the system using the concretization rule stored to generate system configuration information, which is information indicating the configuration of the system in which the unconfirmed portion is not included, on the basis of the configuration requirements.

(Supplementary note 2) The system configuration derivation device according to Supplementary note 1, wherein the concretization rule specifies a plurality of methods for concretizing, and the generation unit is configured to generate a plurality of pieces of system configuration information by applying the plurality of methods to the abstract configuration information.

(Supplementary note 3) The system configuration derivation device according to Supplementary note 1 or 2, wherein the abstract configuration information includes a plurality of unconfirmed portions having different abstraction degrees, and the generation unit is configured to stop operation of concretizing the abstract configuration information included in the configuration requirements when all of the plurality of unconfirmed portions are concretized.

(Supplementary note 4) The system configuration derivation device according to any one of Supplementary notes 1 to 3, wherein the abstract configuration information includes a constraint condition imposed on a system or a requirement regarding properties required for the system, and the generation unit is configured to preferentially generate system configuration information satisfying the constraint condition or the requirement.

(Supplementary note 5) The system configuration derivation device according to any one of Supplementary notes 1 to 4, wherein the concretization rule includes information regarding configuration after an unconfirmed portion is concretized, and the generation unit is configured to add the information to the configuration after the unconfirmed portion is concretized.

(Supplementary note 6) The system configuration derivation device according to any one of Supplementary notes 1 to 5, wherein the concretization rule includes a rule specifying a method for concretizing the abstract configuration information by confirming only a part of an unconfirmed portion of the abstract configuration information.

(Supplementary note 7) The system configuration derivation device according to any one of Supplementary notes 1 to 6, wherein the generation unit is configured to generate the system configuration information using a tree whose root is the configuration requirements of the system.

(Supplementary note 8) The system configuration derivation device according to Supplementary note 7, wherein the generation unit is configured to select a method for concretizing from methods that have not been applied by tracing a concretization process of the abstract configuration information represented by the tree.

(Supplementary note 9) The system configuration derivation device according to any one of Supplementary notes 1 to 8, wherein the generation unit is configured to output an unconfirmed portion that has been concretized and an applied method for concretizing as information regarding a concretization process of the configuration requirements.

(Supplementary note 10) The system configuration derivation device according to any one of Supplementary notes 1 to 9 further including a determination unit configured to determine a policy regarding concretization of the abstract configuration information, wherein the determination unit is configured to determine a part of the abstract configuration information to be concretized in determination of the policy regarding concretization and to select the concretization rule to be used to concretize the determined part, and the generation unit is configured to concretize the determined part using the selected concretization rule.

(Supplementary note 11) The system configuration derivation device according to Supplementary note 10, wherein the determination unit is configured to determine a policy regarding concretization on the basis of a predetermined determination rule or a past determination history.

(Supplementary note 12) The system configuration derivation device according to Supplementary note 10 or 11, wherein the determination unit is configured to determine a policy regarding concretization on the basis of an input from outside.

(Supplementary note 13) The system configuration derivation device according to any one of Supplementary notes 1 to 12 further including a combining unit configured to combine a plurality of pieces of divided abstract configuration information, wherein the generation unit is configured to concretize the plurality of pieces of abstract configuration information that is combined.

(Supplementary note 14) The system configuration derivation device according to any one of Supplementary notes 1 to 13 further including a conversion unit configured to convert a format of the system configuration information, wherein the conversion unit is configured to convert a format of the generated system configuration information into a format that can be received by a deployment device of a system and to transmit the converted system configuration information to the deployment device.

(Supplementary note 15) The system configuration derivation device according to Supplementary note 14 further including a confirmation unit configured to confirm whether or not the configuration of the system satisfies the configuration requirements, wherein the confirmation unit is configured to confirm whether or not the configuration of a current system deployed by the deployment device satisfies the configuration requirements and to input an update request for the system that does not satisfy the configuration requirements to the generation unit, and the generation unit is configured to generate system configuration information that satisfies the configuration requirements on the basis of the input update request.

(Supplementary note 16) A system configuration derivation method including: storing, in a storage unit, a concretization rule in which a method is specified for concretizing abstract configuration information by confirming an unconfirmed portion of the abstract configuration information, which is information indicating configuration of a system in which the unconfirmed portion is included; and concretizing the abstract configuration information included in configuration requirements of the system using the concretization rule stored to generate system configuration information, which is information indicating the configuration of the system in which the unconfirmed portion is not included, on the basis of the configuration requirements.

(Supplementary note 17) A system configuration derivation program or a computer-readable recording medium recording the program causing a computer to execute: a storing process for storing, in a storage unit, a concretization rule in which a method is specified for concretizing abstract configuration information by confirming an unconfirmed portion of the abstract configuration information, which is information indicating configuration of a system in which the unconfirmed portion is included; and a generating process for concretizing the abstract configuration information included in configuration requirements of the system using the concretization rule stored to generate system configuration information, which is information indicating the configuration of the system in which the unconfirmed portion is not included, on the basis of the configuration requirements.

The present invention has been described with reference to the exemplary embodiments and examples, but is not limited to the above exemplary embodiments and examples.

Various changes that can be understood by those skilled in the art within the scope of the present invention can be made to the configurations and details of the present invention.

This application claims priority based on Japanese Patent Application No. 2018-089145 filed on May 7, 2018, the disclosure of which is incorporated herein in its entirety.

REFERENCE SIGNS LIST 90, 100 to 104 System configuration derivation device
81 CPU
82 Main storage unit
83 Communication unit
84 Auxiliary storage unit
85 Input unit
86 Output unit
87 System bus
91 Storage unit
92 Generation unit
110 Configuration information concretization unit
120 Concretization rule recording unit
130 Concretization policy determination unit
140 Requirement combining unit
150 Configuration information conversion unit
160 Configuration requirement recording unit
170 Requirement confirmation unit
200 Deployment device
300 Monitoring device
400 State management device

What is claimed is:

1. A system configuration derivation device comprising:
a storage unit, implemented by a memory, configured to store a concretization rule in which a method is specified for concretizing abstract configuration information by confirming an unconfirmed portion of the abstract configuration information, which is information indicating configuration of a system in which the unconfirmed portion is included;
a generation unit, implemented by a processor, configured to concretize the abstract configuration information included in configuration requirements of the system using the concretization rule stored to generate system configuration information, which is information indicating the configuration of the system in which the unconfirmed portion is not included, on the basis of the configuration requirements; and
a combining unit, implemented by the processor, configured to combine a plurality of pieces of divided abstract configuration information by eliminating duplicates among the plurality of pieces of divided abstract configuration information, wherein the plurality of pieces of divided abstract configuration information have been inputted by a respective plurality of users,
wherein the abstract configuration information includes a constraint condition imposed on the system or a requirement regarding properties required for the system,
wherein the generation unit is configured to preferentially generate system configuration information satisfying the constraint condition or the requirement, and concretize the plurality of pieces of abstract configuration information that is combined, and
wherein the plurality of pieces of divided abstract configuration information include:
a first piece of abstract configuration information inputted by a first user and indicating a first use of the Internet for browsing, a second piece of abstract configuration information inputted by a second user and indicating a second use of the Internet for electronic mail, and a third piece of abstract configuration information inputted by a third user and indicating a third use of the Internet for to reach a first network router by a first connection and that a second connection to a second network router is prohibited.

2. The system configuration derivation device according to claim 1, wherein
the concretization rule specifies a plurality of methods for concretizing, and
the generation unit is configured to generate a plurality of pieces of system configuration information by applying the plurality of methods to the abstract configuration information.

3. The system configuration derivation device according to claim 1, wherein
the abstract configuration information includes a plurality of unconfirmed portions having different abstraction degrees, and
the generation unit is configured to stop operation of concretizing the abstract configuration information included in the configuration requirements when all of the plurality of unconfirmed portions are concretized.

4. The system configuration derivation device according to claim 1, wherein
the concretization rule includes information regarding configuration after an unconfirmed portion is concretized, and
the generation unit is configured to add the information to the configuration after the unconfirmed portion is concretized.

5. The system configuration derivation device according to claim 1, wherein
the concretization rule includes a rule specifying a method for concretizing the abstract configuration information by confirming only a part of an unconfirmed portion of the abstract configuration information.

6. The system configuration derivation device according to claim 1, wherein
the generation unit is configured to generate the system configuration information using a tree whose root is the configuration requirements of the system.

7. The system configuration derivation device according to claim 6, wherein
the generation unit is configured to select a method for concretizing from methods that have not been applied by tracing a concretization process of the abstract configuration information represented by the tree.

8. The system configuration derivation device according to claim 1, wherein
the generation unit is configured to output an unconfirmed portion that has been concretized and an applied method for concretizing as information regarding a concretization process of the configuration requirements.

9. The system configuration derivation device according to claim 1, further comprising
a determination unit, implemented by the processor, configured to determine a policy regarding concretization of the abstract configuration information, wherein
the determination unit is configured to determine a part of the abstract configuration information to be concretized in determination of the policy regarding concretization and to select the concretization rule to be used to concretize the determined part, and
the generation unit is configured to concretize the determined part using the selected concretization rule.

10. The system configuration derivation device according to claim 9, wherein
the determination unit is configured to determine a policy regarding concretization on the basis of a predetermined determination rule or a past determination history.

11. The system configuration derivation device according to claim 9, wherein
the determination unit is configured to determine a policy regarding concretization on the basis of an input from outside.

12. The system configuration derivation device according to claim 1, further comprising
a conversion unit, implemented by the processor, configured to convert a format of the system configuration information, wherein
the conversion unit is configured to convert a format of the generated system configuration information into a format that can be received by a deployment device of a system and to transmit the converted system configuration information to the deployment device.

13. The system configuration derivation device according to claim 12, further comprising
a confirmation unit, implemented by the processor, configured to confirm whether or not the configuration of the system satisfies the configuration requirements, wherein
the confirmation unit is configured to confirm whether or not the configuration of a current system deployed by the deployment device satisfies the configuration requirements and to input an update request for the system that does not satisfy the configuration requirements to the generation unit, and
the generation unit is configured to generate system configuration information that satisfies the configuration requirements on the basis of the input update request.

14. The system configuration derivation device according to claim 2, wherein
the abstract configuration information includes a plurality of unconfirmed portions having different abstraction degrees, and
the generation unit is configured to stop operation of concretizing the abstract configuration information included in the configuration requirements when all of the plurality of unconfirmed portions are concretized.

15. The system configuration derivation device according to claim 1, wherein the combining unit is further configured to combine the first use, the second use and the third use into a single constituent element representing the Internet.

16. The system configuration derivation device according to claim 15, wherein the combined plurality of pieces of divided abstract configuration information indicate a configuration including using the Internet for browsing, for electronic mail and for reaching the first network router by the first connection and for not communicating via the second connection.

17. A system configuration derivation method comprising:
storing, in a storage unit, a concretization rule in which a method is specified for concretizing abstract configuration information by confirming an unconfirmed portion of the abstract configuration information, which is information indicating configuration of a system in which the unconfirmed portion is included;

concretizing the abstract configuration information included in configuration requirements of the system using the concretization rule stored to generate system configuration information, which is information indicating the configuration of the system in which the unconfirmed portion is not included, on the basis of the configuration requirements;

generating system configuration information satisfying a constraint condition or a requirement preferentially;

combining a plurality of pieces of divided abstract configuration information by eliminating duplicates among the plurality of pieces of divided abstract configuration information, wherein the plurality of pieces of divided abstract configuration information have been inputted by a respective plurality of users; and concretizing the plurality of pieces of abstract configuration information that is combined, wherein the abstract configuration information includes the constraint condition imposed on the system or the requirement regarding properties required for the system, and wherein the plurality of pieces of divided abstract configuration information include:

a first piece of abstract configuration information inputted by a first user and indicating a first use of the Internet for browsing, a second piece of abstract configuration information inputted by a second user and indicating a second use of the Internet for electronic mail, and a third piece of abstract configuration information inputted by a third user and indicating a third use of the Internet for to reach a first network router by a first connection and that a second connection to a second network router is prohibited.

18. A non-transitory computer-readable recording medium recording a system configuration derivation program causing, when executed by a computer, the computer to execute:

storing, in a storage unit, a concretization rule in which a method is specified for concretizing abstract configuration information by confirming an unconfirmed portion of the abstract configuration information, which is information indicating configuration of a system in which the unconfirmed portion is included;

concretizing the abstract configuration information included in configuration requirements of the system using the concretization rule stored to generate system configuration information, which is information indicating the configuration of the system in which the unconfirmed portion is not included, on the basis of the configuration requirements;

generating system configuration information satisfying a constraint condition or a requirement preferentially;

combining a plurality of pieces of divided abstract configuration information by eliminating duplicates among the plurality of pieces of divided abstract configuration information, wherein the plurality of pieces of divided abstract configuration information have been inputted by a respective plurality of users; and concretizing the plurality of pieces of abstract configuration information that is combined, wherein the abstract configuration information includes the constraint condition imposed on the system or the requirement regarding properties required for the system, and wherein the plurality of pieces of divided abstract configuration information include:

a first piece of abstract configuration information inputted by a first user and indicating a first use of the Internet for browsing, a second piece of abstract configuration information inputted by a second user and indicating a second use of the Internet for electronic mail, and a third piece of abstract configuration information inputted by a third user and indicating a third use of the Internet for to reach a first network router by a first connection and that a second connection to a second network router is prohibited.

* * * * *